United States Patent
Marass et al.

(10) Patent No.: US 12,200,159 B2
(45) Date of Patent: Jan. 14, 2025

(54) SECURITY SYSTEM FOR INMATE WIRELESS DEVICES

(71) Applicant: **GLOBAL TEL*LINK CORPORATION**, Reston, VA (US)

(72) Inventors: Jason Marass, Fairhope, AL (US); Brian Peters, St. Paul, MN (US); Garth Johnson, Indianapolis, IN (US); Stephen Lee Hodge, Dallas, TX (US)

(73) Assignee: **Global Tel*Link Corporation**, Reston, VA (US)

(*) Notice: Subject to any disclaimer, the term of this patent is extended or adjusted under 35 U.S.C. 154(b) by 0 days.

(21) Appl. No.: 17/576,282

(22) Filed: Jan. 14, 2022

(65) Prior Publication Data

US 2022/0210257 A1    Jun. 30, 2022

Related U.S. Application Data

(63) Continuation of application No. 16/925,076, filed on Jul. 9, 2020, now Pat. No. 11,228,672, which is a
(Continued)

(51) Int. Cl.
*H04W 4/50* (2018.01)
*H04M 1/18* (2006.01)
(Continued)

(52) U.S. Cl.
CPC ....... *H04M 1/185* (2013.01); *H04M 1/72412* (2021.01); *H04W 4/50* (2018.02);
(Continued)

(58) Field of Classification Search
CPC ..... H04W 4/50; H04W 12/08; H04W 12/082; H04W 12/084
See application file for complete search history.

(56) References Cited

U.S. PATENT DOCUMENTS

| 4,495,386 A | 1/1985 | Brown et al. |
| 5,255,306 A | 10/1993 | Melton et al. |

(Continued)

OTHER PUBLICATIONS

"Criminal Calls: A Review of the Bureau of Prisons' Management of Inmate Telephone Privileges," U.S. Department of Justice, Office of the Inspector General, Aug. 1999.
(Continued)

*Primary Examiner* — Barry W Taylor
(74) *Attorney, Agent, or Firm* — Sterne, Kessler, Goldstein & Fox P.L.L.C.

(57) ABSTRACT

A layered security suite is disclosed wherein multiple security barriers that prevent the unsanctioned use of a mobile device issued by a controlled-environment facility. The security barriers are implemented along multiple points within the communication path between the mobile device with outside networks, including on the mobile device, on wireless access points that serve data traffic for the mobile device, and a firewall device that monitors all data coming to and from the wireless access points. The barriers on the mobile device prevent the user from performing unsanctioned application and settings changes, including both software and hardware components, while the barrier on the wireless access point detects and prevents unauthorized connections between mobile devices and unsanctioned wireless access points. The firewall device discards packets with unsanctioned internet addresses. The layers work in concert to prevent all manner of tampering with the mobile device by members of the controlled-environment facility.

20 Claims, 10 Drawing Sheets

Related U.S. Application Data continuation of application No. 15/435,993, filed on Feb. 17, 2017, now Pat. No. 10,721,624.

(51) Int. Cl.

| | |
|---|---|
| *H04M 1/72412* | (2021.01) |
| *H04W 12/08* | (2021.01) |
| *H04W 12/082* | (2021.01) |
| *H04W 12/084* | (2021.01) |
| *H04W 12/088* | (2021.01) |
| H04M 1/67 | (2006.01) |
| H04M 1/72409 | (2021.01) |
| H04W 4/80 | (2018.01) |
| H04W 12/126 | (2021.01) |
| H04W 12/30 | (2021.01) |
| H04W 12/37 | (2021.01) |

(52) U.S. Cl.
CPC ......... *H04W 12/08* (2013.01); *H04W 12/082* (2021.01); *H04W 12/084* (2021.01); *H04W 12/088* (2021.01); *H04M 1/67* (2013.01); *H04M 1/72409* (2021.01); *H04W 4/80* (2018.02); *H04W 12/126* (2021.01); *H04W 12/35* (2021.01); *H04W 12/37* (2021.01)

(56) References Cited

U.S. PATENT DOCUMENTS

| | | | |
|---|---|---|---|
| 5,896,556 | A | 4/1999 | Moreland et al. |
| 6,054,928 | A | 4/2000 | Lemelson et al. |
| 6,058,173 | A | 5/2000 | Penfield et al. |
| 6,668,045 | B1 | 12/2003 | Mow |
| 6,965,590 | B1 | 11/2005 | Schmidl et al. |
| 7,085,359 | B2 | 8/2006 | Crites et al. |
| 7,106,843 | B1 | 9/2006 | Gainsboro et al. |
| 7,218,993 | B2 | 5/2007 | Yasukawa et al. |
| 7,254,708 | B2 | 8/2007 | Silvester |
| 7,280,816 | B2 | 10/2007 | Fratti et al. |
| 7,333,798 | B2 | 2/2008 | Hodge |
| 7,366,782 | B2 | 4/2008 | Chong et al. |
| 7,529,357 | B1 | 5/2009 | Rae et al. |
| 7,587,067 | B1 | 9/2009 | Schiller |
| 7,742,581 | B2 | 6/2010 | Hodge et al. |
| 7,804,941 | B2 | 9/2010 | Keiser et al. |
| 7,860,222 | B1 | 12/2010 | Sidler et al. |
| 7,899,167 | B1 | 3/2011 | Rae |
| 8,019,354 | B2 | 9/2011 | Rae et al. |
| 8,031,052 | B2 | 10/2011 | Polozola |
| 8,370,206 | B2 | 2/2013 | Collins |
| 8,428,559 | B2 | 4/2013 | Silva |
| 8,498,937 | B1 | 7/2013 | Shipman, Jr. et al. |
| 8,571,525 | B2 | 10/2013 | Weinstein et al. |
| 8,639,926 | B2 | 1/2014 | Brown et al. |
| 8,646,056 | B2 | 2/2014 | Poplett |
| 8,917,848 | B2 | 12/2014 | Torgersrud et al. |
| 9,094,500 | B1 | 7/2015 | Edwards |
| 9,124,763 | B2 | 9/2015 | Humphries |
| 9,232,051 | B2 | 1/2016 | Torgersrud et al. |
| 9,262,604 | B2 | 2/2016 | Kimbrell |
| 9,272,713 | B1 | 3/2016 | Dvoskin |
| 9,282,188 | B2 | 3/2016 | Hodge et al. |
| 9,307,386 | B2 | 4/2016 | Hodge et al. |
| 9,614,954 | B2 | 4/2017 | Hodge et al. |
| 9,614,955 | B2 | 4/2017 | Hodge et al. |
| 9,661,128 | B2 | 5/2017 | Hodge et al. |
| 9,674,338 | B2 | 6/2017 | Hodge et al. |
| 9,866,680 | B2 | 1/2018 | Hodge et al. |
| 9,871,915 | B2 | 1/2018 | Hodge et al. |
| 9,878,660 | B1 | 1/2018 | Hodge |
| 9,888,108 | B2 | 2/2018 | Hodge et al. |
| 9,892,242 | B1 | 2/2018 | Hodge |
| 10,068,398 | B1 | 9/2018 | Hodge |
| 10,205,727 | B2 | 2/2019 | Hodge |
| 10,205,820 | B2 | 2/2019 | Hodge |
| 10,341,484 | B2 | 7/2019 | Hodge et al. |
| 10,464,474 | B2 | 11/2019 | Hodge |
| 10,721,624 | B2 | 7/2020 | Marass et al. |
| 11,228,672 | B2 | 1/2022 | Marass et al. |
| 2002/0071537 | A1 | 6/2002 | Gainsboro |
| 2003/0036381 | A1 | 2/2003 | Nagashima |
| 2003/0086546 | A1 | 5/2003 | Falcone et al. |
| 2003/0126470 | A1 | 7/2003 | Crites et al. |
| 2003/0198325 | A1 | 10/2003 | Bayne |
| 2003/0224764 | A1 | 12/2003 | Baker |
| 2004/0023698 | A1 | 2/2004 | Chang |
| 2005/0265529 | A1 | 12/2005 | Hogg, Jr. et al. |
| 2006/0047748 | A1* | 3/2006 | Kelso ............... H04L 67/306 709/204 |
| 2006/0062355 | A1 | 3/2006 | Leonard |
| 2006/0095175 | A1 | 5/2006 | DeWaal et al. |
| 2006/0176169 | A1 | 8/2006 | Doolin et al. |
| 2007/0041545 | A1 | 2/2007 | Gainsboro |
| 2007/0047694 | A1 | 3/2007 | Bouchard et al. |
| 2007/0057763 | A1 | 3/2007 | Blattner et al. |
| 2008/0057976 | A1 | 3/2008 | Rae et al. |
| 2008/0200156 | A1 | 8/2008 | Hicks et al. |
| 2009/0080629 | A1 | 3/2009 | Rokosky et al. |
| 2009/0128356 | A1 | 5/2009 | Nitta et al. |
| 2010/0062833 | A1 | 3/2010 | Mattice et al. |
| 2010/0189228 | A1 | 7/2010 | Seyfetdinov |
| 2010/0260173 | A1 | 10/2010 | Johnson |
| 2011/0004878 | A1 | 1/2011 | Divoux |
| 2011/0039581 | A1 | 2/2011 | Cai et al. |
| 2011/0158223 | A1 | 6/2011 | Liu et al. |
| 2011/0162060 | A1 | 6/2011 | Vijayakumar et al. |
| 2011/0213618 | A1 | 9/2011 | Hodge et al. |
| 2011/0237226 | A1 | 9/2011 | Dhuna |
| 2012/0099714 | A1 | 4/2012 | Hodge |
| 2012/0252411 | A1 | 10/2012 | Johnsgard et al. |
| 2012/0262271 | A1 | 10/2012 | Torgersrud et al. |
| 2013/0179210 | A1 | 7/2013 | Collins |
| 2013/0224718 | A1* | 8/2013 | Woodward ............ G09B 7/08 434/350 |
| 2013/0293378 | A1 | 11/2013 | Aninye et al. |
| 2013/0311364 | A1 | 11/2013 | Shipman et al. |
| 2013/0318594 | A1 | 11/2013 | Hoy et al. |
| 2014/0032691 | A1 | 1/2014 | Barton et al. |
| 2014/0044242 | A1 | 2/2014 | Hodge et al. |
| 2014/0089849 | A1 | 3/2014 | Choi et al. |
| 2014/0108649 | A1 | 4/2014 | Barton |
| 2014/0109174 | A1 | 4/2014 | Barton et al. |
| 2014/0115466 | A1 | 4/2014 | Barak et al. |
| 2014/0157141 | A1 | 6/2014 | Hussain |
| 2014/0219432 | A1 | 8/2014 | Bengston et al. |
| 2014/0226487 | A1 | 8/2014 | Forssell et al. |
| 2014/0267547 | A1 | 9/2014 | Torgersrud et al. |
| 2014/0273929 | A1 | 9/2014 | Torgersrud |
| 2014/0282868 | A1 | 9/2014 | Sheller et al. |
| 2014/0287715 | A1 | 9/2014 | Hodge et al. |
| 2014/0298403 | A1* | 10/2014 | Qureshi ............ H04L 63/20 726/1 |
| 2014/0333425 | A1 | 11/2014 | Giraud |
| 2015/0040246 | A1* | 2/2015 | Yuen ................ H04L 63/0876 726/30 |
| 2015/0105105 | A1 | 4/2015 | Van Heerden et al. |
| 2015/0237052 | A1 | 8/2015 | Brique et al. |
| 2015/0242629 | A1 | 8/2015 | Lindo et al. |
| 2016/0055323 | A1 | 2/2016 | Stuntebeck et al. |
| 2016/0066182 | A1 | 3/2016 | Hodge et al. |
| 2016/0088021 | A1 | 3/2016 | Jayanti Venkata et al. |
| 2016/0094560 | A1 | 3/2016 | Stuntebeck |
| 2016/0219146 | A1 | 7/2016 | Hodge et al. |
| 2016/0267257 | A1 | 9/2016 | Wisgo |
| 2016/0291643 | A1 | 10/2016 | Sande |
| 2016/0309008 | A1 | 10/2016 | Hangsleben |
| 2016/0330084 | A1 | 11/2016 | Hunter et al. |
| 2016/0381212 | A1 | 12/2016 | Hodge et al. |
| 2016/0381219 | A1 | 12/2016 | Hodge et al. |
| 2016/0381556 | A1 | 12/2016 | Hodge et al. |
| 2017/0013393 | A1 | 1/2017 | Chang |
| 2017/0039784 | A1 | 2/2017 | Gelbart et al. |
| 2017/0061006 | A1 | 3/2017 | Hildebrand et al. |

(56) References Cited

U.S. PATENT DOCUMENTS

| | | | |
|---|---|---|---|
| 2017/0084150 A1 | 3/2017 | Keyton | |
| 2017/0146801 A1 | 5/2017 | Stempora | |
| 2017/0149795 A1* | 5/2017 | Day, II | H04W 4/02 |
| 2017/0168164 A1 | 6/2017 | Lee | |
| 2017/0177892 A1 | 6/2017 | Tingstrom et al. | |
| 2017/0193622 A1 | 7/2017 | Rosado | |
| 2017/0208468 A1 | 7/2017 | Hodge et al. | |
| 2017/0233168 A1 | 8/2017 | Horvath et al. | |
| 2017/0244729 A1* | 8/2017 | Fahrny | G06F 21/552 |
| 2017/0329966 A1* | 11/2017 | Koganti | G06F 21/56 |
| 2018/0039779 A1 | 2/2018 | Li et al. | |
| 2018/0097841 A1* | 4/2018 | Stolarz | G06N 5/043 |
| 2018/0159972 A1 | 6/2018 | Hodge et al. | |
| 2018/0165936 A1* | 6/2018 | Smith | H04W 4/029 |
| 2018/0242155 A1 | 8/2018 | Marass et al. | |
| 2018/0275859 A1 | 9/2018 | Hodge | |
| 2018/0316675 A1 | 11/2018 | Hodge | |
| 2019/0215696 A1 | 7/2019 | Ying et al. | |
| 2020/0412860 A1 | 12/2020 | Marass et al. | |

OTHER PUBLICATIONS

European Search Report and Opinion directed to European Patent Application No. 14769931.8, dated Oct. 26, 2016; 10 pages.

File History of U.S. Pat. No. 9,094,500, U.S. Appl. No. 14/322,869, filed Jul. 2, 2014.

File History of U.S. Pat. No. 9,307,386, U.S. Appl. No. 13/946,637, filed Jul. 19, 2013.

International Search Report and Written Opinion of the International Searching Authority directed to related International Patent Application No. PCT/US2018/000080, mailed Apr. 30, 2018; 13 pages.

International Search Report and Written Opinion of the International Searching Authority directed to related International Patent Application No. PCT/US2018/024611, mailed Jun. 11, 2018; 8 pages.

International Search Report and Written Opinion of the International Searching Authority, directed to related International Patent Application No. PCT/US14/31339, mailed Nov. 6, 2014; 19 pages.

Knox, "The Problem of Gangs and Security Threat Groups (STG's) in American Prisons Today: Recent Research Findings From the 2004 Prison Gang Survey," National Gang Crime Research Center, 2005; 67 pages.

Rey, R.F., ed., "Engineering and Operations in the Bell System," 2nd Edition, AT&T Bell Laboratories: Murray Hill, NJ, 1983.

Rosenberg, et al., "SIP: Session Initial Protocol," Network Working Group, Standard Track, Jun. 2002; 269 pages.

U.S. Appl. No. 61/801,861, "Handheld Video Visitation," to Torgersrud, et al., filed Mar. 15, 2013.

U.S. Appl. No. 61/804,479, filed Mar. 22, 2013.

Winterdyk et al., "Managing Prison Gangs," Journal of Criminal Justice, vol. 38, 2010; pp. 730-736.

\* cited by examiner

SECURITY SYSTEM FOR INMATE WIRELESS DEVICES

CROSS-REFERENCE TO RELATED APPLICATIONS

This application is a continuation of U.S. patent application Ser. No. 16/925,076, filed Jul. 9, 2020, which is a continuation of U.S. patent application Ser. No. 15/435,993, filed Feb. 17, 2017, issued as U.S. Pat. No. 10,721,624 on Jul. 21, 2020, which are incorporated by reference herein in their entireties.

BACKGROUND

Field

The disclosure relates to a system and method for detecting and locating contraband devices in a correctional facility utilizing mobile devices.

Background

In corrections environments such as prisons, telecommunications are highly monitored and controlled. Typically, a correctional facility makes use of an inmate communication system (ICS), sometimes called an inmate telecommunication system (ITS), that provides both the infrastructure for inmates to communicate with individuals outside of the facility. The ICS also provides correctional facility personnel the ability to record, monitor and control these communications. Inmates are typically afforded a small number of individuals that they can communicate with, such as lawyers, family members, and friends. Inmates are also typically subject to specific restrictions on their communications. For example, inmates are explicitly restricted from contacting other parties, such as judges, witnesses, or accomplices related to their alleged offenses. There also may be a time of day, a length of call, three-way call or other restrictions on calls, all of which must be controlled by way of various instrumentalities that may include computer controlled equipment at the facility and/or at remote locations in addition to human monitoring and/or control. To facilitate these communications and the security measures required to enforce these and other restrictions, an ICS may deploy a wireless infrastructure within the correctional facility grounds and mobile devices sanctioned by the correctional facility may be issued to inmates to allow them perform these communications.

Great lengths are taken to prevent the illicit use of the ICS. An ICS may be configured to record and monitor inmate communications attempted using a mobile device issued to an inmate. With the advances of communications technologies, there may be new methods to bypass security measures. Inmates may seek to discover and exploit the new technology to overcome the restrictions placed on their communications. In particular, the mobile devices, once issued by the correctional facility, may be subject to all manner of tampering.

While various aspects and alternative features are known in the field of communication monitoring, no one design has emerged that generally addresses the concerns of the prison industry, as discussed herein.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
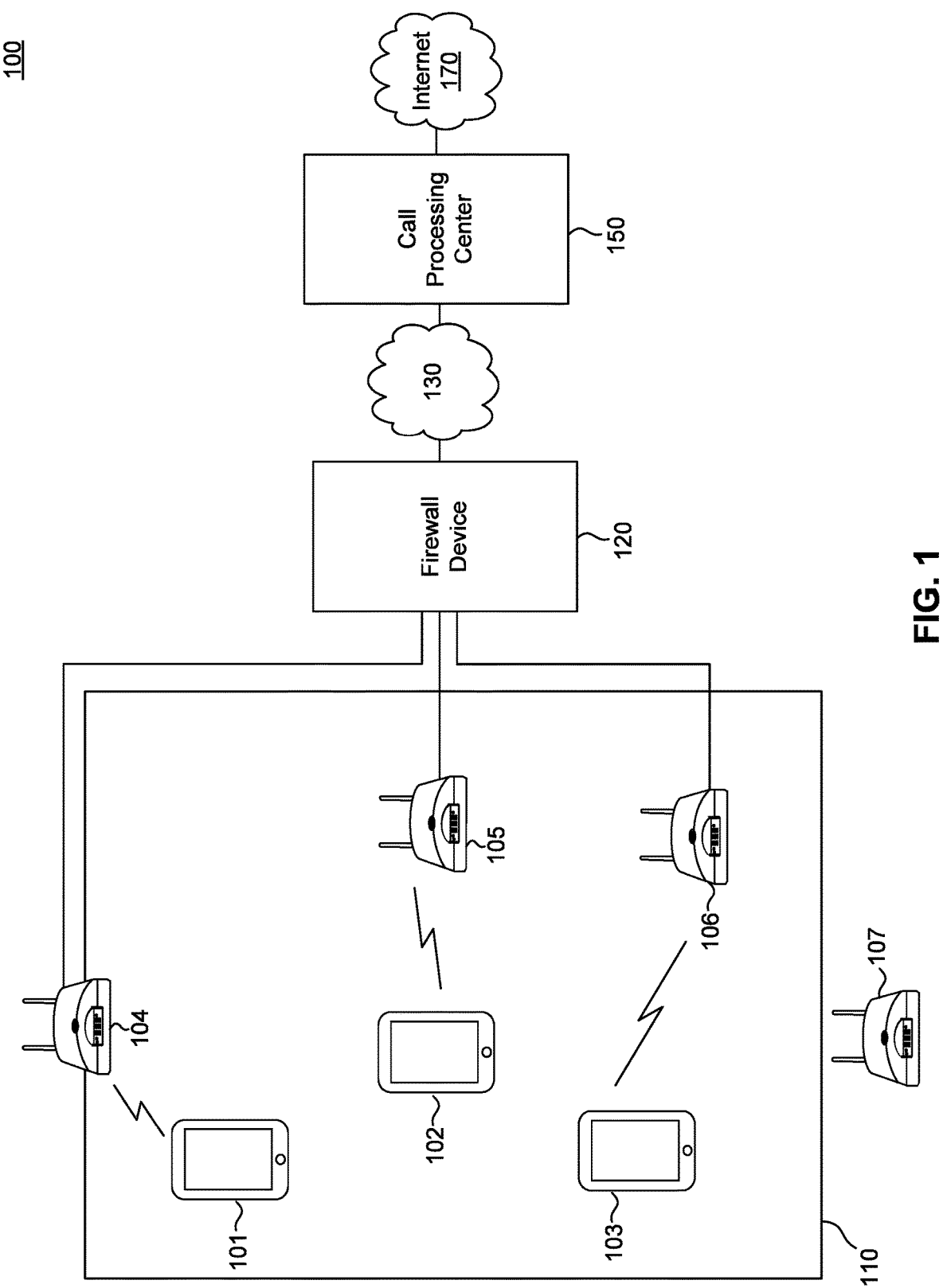
FIG. 1 illustrates a block diagram of a detection and monitoring system, according to an exemplary embodiment of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

As discussed above, with the advances in communications technologies, correctional facilities and ICS providers now have the need to secure sanctioned mobile devices against all manner of new threats. With the advent of smart devices such as smartphones and tablet devices that allow both traditional voice and data communication capabilities, it is now common in correctional facilities for mobile devices to be issued to inmates for temporary use. The ICS provider will typically deploy a wireless network infrastructure, comprising wireless access points and internet backbone connection to the prison to enable these mobile devices to communicate with the outside world. These mobile devices, in conjunction with the wireless network infrastructure, allow the inmates to engage in several activities that are sanctioned by the correctional facility, such as telephone conversation with allowed parties and limited internet access with approved websites and services. However, because of the much wider functionality available in devices as compared to traditional controlled environment telephone systems, such as internet access through cellular and wireless communications technologies and the installation of use of software applications on memory in the device, these devices also pose new security risks that must be addressed by ICS providers. These new security risks are manifold, and when exploited allow the inmates to use the mobile device for unsanctioned functions, connect to wireless networks not sanctioned by or deployed in the correctional facility, and access internet and other data content not authorized by the correctional facility.

An inmate may physically tamper with a mobile device such that the inner circuitry of the device is altered to allow for unsanctioned activity in the phone. Because mobile devices are typically equipped with at least one of the common variants of a universal serial bus (USB) connector (e.g. micro-USB, mini-USB, USB 3.0, etc.) the power of the battery may be used to charge a contraband device that has been smuggled into the correctional facility by a wily inmate. Access to the USB connector also allows other smuggled peripheral devices (e.g. a keyboard, wireless hot spot adapter, etc.) to be used with the phone to provide functionality not sanctioned by the correctional facility. In fact, the battery itself may also be used as a weapon or a tool for escape or other shenanigans, as mobile device batteries are typically made with potentially dangerous, corrosive, or flammable substances such as a lithium-ion battery.

The software applications installed on the mobile device also pose security risks to the phone. A clever inmate may prod applications for vulnerabilities either secured poorly or unconsidered by the correctional facility or ICS provider. Many applications (e.g. Facebook, Yelp, etc.) provide social functions such as commenting and messaging that can be used for clandestine communications between an inmate and an unauthorized outside party that may evade detection by the correctional facility. Other applications have features that have unintended implications for security risks. For example, while there are several applications that serve as dedicated internet web browsers that may be thoughtfully regulated by a correctional facility or ICS provider, such as Chrome or Firefox, other applications often employ a proprietary web-browser that would escape such thoughtful regulation. Inmates could use these proprietary web-browsers to access unauthorized internet web domains. Furthermore, an inmate can simply install new applications on an unsecured mobile device that allow for unsanctioned functionalities without any knowledge by the correctional facility. As such, application management functions and the applications themselves need to be secured by the ICS provider.

An unsecured operating system (OS) of the mobile device poses yet another set of security risks to the phone. The operating system typically governs the capabilities of the device, such as which radios the mobile device has switched on (WiFi, Bluetooth, Cellular), which wireless networks to connect to and any required login information, and other important device settings. These settings will typically be accessible through a simple graphical user interface (GUI). Inmates may access these settings to allow the mobile device to connect to a wireless access point outside of the correctional facility or otherwise not provided or monitored by the ICS provider, which in turn allows the mobile device to circumvent network security measures operating on the wireless infrastructure deployed by the ICS. Access to shortwave radio technology such as Bluetooth allows the device to pair, communicate, and exchange data with another mobile device or a contraband device smuggled into the facility without the correctional facility personnel ever detecting it. Therefore, the ICS provider must also take steps to secure the operating system from allowing unsanctioned activity.

The wireless access points themselves may also implement security features to prevent unsanctioned use of the mobile device. Wireless access points may be equipped with wireless intrusion prevention (WIP) systems that detect activity between sanctioned mobile devices and wireless access points outside of the correctional facility. Furthermore, the supporting wired network that links the wireless access points to outside networks such as the internet may also provide security features such as access control lists to prevent data packets from certain websites and IP addresses.

In light of the above, the present disclosure provides details of a layered security system for preventing unsanctioned use of a mobile device within a correctional facility. In embodiments, multiple security barriers are devised in the hardware and software of the mobile device and in the wireless network infrastructure deployed by the ICS provider in the correctional facility that prevent the unsanctioned use. These barriers are "layered" in that they act as a next barrier of protection when a previous barrier fails.

FIG. 1 illustrates a block diagram of a correctional facility 100 within a correctional facility environment, according to embodiments of the present disclosure. In an exemplary embodiment, the system comprises mobile devices 101-103 and wireless access point devices 104-106 within the correctional facility grounds 110, a firewall device 120, a network 130, and a communications processing center 150 connected to the internet 170. Within the correctional facility grounds 110, mobile devices 101-103 are devices which are issued by the correctional facility to facilitate inmate communications with individuals outside of the correctional facility environment. The mobile devices are configured to perform authorized communications with outside parties, including texting, audio, and video communication.

In the present disclosure, different security measures are deployed on the mobile devices 101-103, the wireless access point devices 104-106, and the firewall device 120 to prevent unsanctioned use of the mobile devices 101-103. The security measures are designed in a layered or stacked fashion, wherein if an inmate manages to bypass one security measure in the stack, the next barrier of the stack should provide additional protection against unsanctioned use of the devices. This security layer structure will be discussed further below.

In embodiments, mobile devices may be capable of accessing limited data services such as internet to law websites, music, and other services. The mobile devices may be encased in a hardware barrier, sometimes called a "clam shell" case, that prevents inmates from physically tampering with the mobile device or having access to all of the ports typically available on such a device, such as the universal serial bus (USB) port. Furthermore, the software applications and the operating system on these mobile devices are designed or otherwise modified by the inmate communication system (ICS) provider and approved by the correctional facility for the purpose of securing and preventing unsanctioned usage of the mobile devices. The design of the hardware barrier, software, and operating system security functions will be described in greater detail below.

The wireless access point devices 104-106 are devices that are deployed by the ICS provider in the correctional facility to server the communications initiated by the mobile devices 101-103. These wireless access point devices will run a version of the IEEE 802.11 "WiFi" protocol that specifies the media access control (MAC) layer and physical (PHY) layer standards that allow wireless communication with the mobile devices. The mobile devices 101-103 form wireless connections with one of the wireless access point devices 104-106. Wireless access point devices 104-106 are deployed throughout the correctional facility. In embodiments, some may serve specific enclosed areas such as a room designated for voice or video call communications, a cafeteria, library, etc. The wireless access point devices are modified to perform wireless intrusion prevention (WIP) functionality that can detect and neutralize unsanctioned wireless activity by the mobile devices 101-103. These functionalities will be described in greater detail below.

In embodiments, wireless access points that are not deployed for use in the correctional facility are also located outside of the facility, as illustrated by wireless access point 107. Such wireless access points are deployed in neighboring buildings without nefarious purpose and are known to the wireless access points 104-106. In another embodiment, wireless access point 107 is smuggled in or around the correctional facility for the purpose of allowing inmates to circumvent the correctional facility wireless network infrastructure and security. In embodiments, security measures on both the mobile devices 101-103 as well as the WIP functionality on wireless access points 104-106 are all designed to prevent mobile devices 101-103 from forming connections devices as exemplified by wireless access point 107, and neutralizing mobile device wireless functionality when they do. These security functions are described in greater detail below.

In embodiments, any communications involving the mobile devices and parties outside the correctional facility are delivered using packetized data. The packetized data is routed through the wireless access points 104-106 to the communications processing center 150 via network 130. Voice is served over packetized voice protocols such as Voice over Internet Protocol (VoIP). Typical packetized data protocols such as transport control protocol/internet protocol (TCP/IP) serve mobile device data services such as restricted web-browsing or music. In embodiments, the mobile devices also connect to the communication center via wired communication links that use other common MAC and PHY layer protocols, such as those associated with the IEEE 802.3 "Ethernet" standard. These wired communication links may be available in designated areas of the correctional facility such as a dedicated telecommunication room or a library.

In embodiments, all communications from the mobile devices are routed through one of the wireless access points 104-106 to a firewall device 120 followed by a network 130. The firewall device stores an access control list (ACL) that enumerates the internet protocol (IP) addresses or the domain names of websites that mobile devices within the correctional facility are allowed to communicate with. All data traffic to or from any mobile device within the facility flows through the firewall device 120. For ease of discussion, the firewall device 120 is shown as a separate device other network elements outside of the correctional facility 110, but this separation is not necessary in all embodiments. The firewall device 120 may be located within the network 130 or the communications processing center 150. The firewall device may be a dedicated set of servers designed to filter all traffic through the ACL, or may be implemented on one or more common routers within network 130.

In embodiments, the network 130 consists of a local area network (LAN), a wide area network (WAN), or the internet. Network 130 is made up of routers and switches running well-known protocols such as IEEE 802.3 "Ethernet" protocol. The network may be owned and provisioned by the correctional facility 110, the ICS provider, or may be part of a public network such as the internet. The network 130 serves to connect the correctional facility's local network infrastructure to a communications processing center 150.

The communication processing center 150 is responsible for monitoring the usage of the mobile devices for any signs of illicit behavior on the part of the inmate using the device. In voice communications, for example, the communication center is responsible for authenticating the inmate party and the outside party to ensure that these parties are allowed to communicate with each other. This will typically be done by comparing the inmate and the outside party to a "white list" or a "black list" of allowed or disallowed parties, such that inmates can only communicate with parties on their white list or not on their black list. Such lists may also be stored on the mobile devices themselves, such that when the mobile device is issued to a particular inmate, the inmate will only be allowed to contact their allowed parties. For data communications, both the communication center and the mobile devices themselves will typically be responsible for preventing the user of the mobile device from accessing prohibited data.

Figure 2:
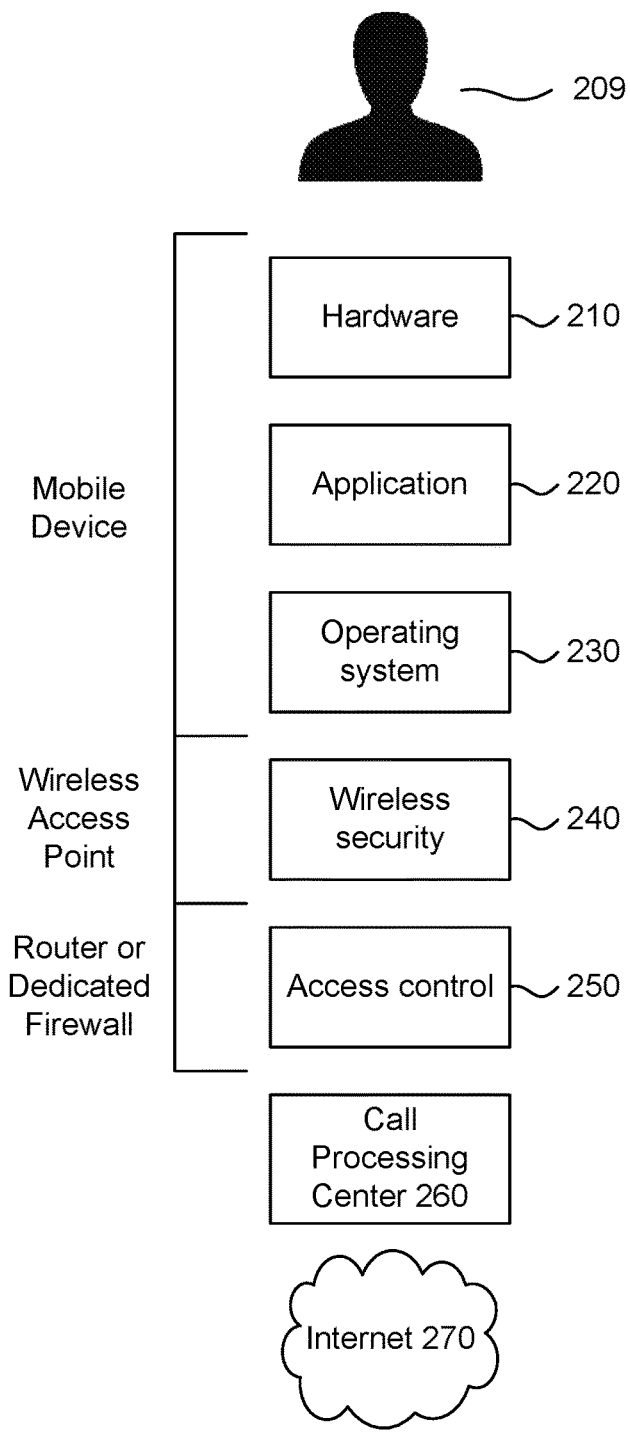
FIG. 2 illustrates the structure of the security barriers, according to an exemplary embodiment of the present disclosure.

FIG. 2 illustrates the layers of security barriers 200 that prevent unsanctioned use of a mobile device. As discussed above, the security measures are implemented on the mobile devices, the wireless access point devices, and the firewall device, such as mobile devices 101-103, wireless access points 104-106, and firewall device 120 as seen in FIG. 1. Inmate 209 must bypass the security barriers 210-250 in order to perform unsanctioned activity. As indicated in FIG. 2, security barriers 210, 220, and 230 are deployed on the mobile devices as embodied by mobile devices 101-103 of FIG. 1, barrier 240 is deployed at wireless access points within the correctional facility as embodied by wireless access points 104-106 of FIG. 1, and barrier 250 is deployed at the firewall device as embodied by firewall device 120 of FIG. 1. Below is a brief description of the barriers and their interactions. All barriers are described in greater detail with respect to FIGS. 3A-3B and FIGS. 4-7. FIG. 2 also depicts call processing center 260, which is an embodiment of call processing center 150 from FIG. 1.

Barrier 210 is the hardware barrier that comprises a physical hardware barrier placed on a mobile device. In an embodiment, the barrier is in the form of a secured case that encloses the mobile device and prevents the inmate from physically altering the mobile device or gaining access to the mobile device power source. Barrier 220 is the application security barrier, implemented on a mobile device, in which applications which are installed on the mobile device are modified and managed to prevent applications form performing unsanctioned activity on the mobile device. Applications stripped of functions that are considered unsanctioned by the correctional facility such as social functions, or the functions may be disabled as deemed necessary by the correctional facility. Furthermore, applications are prevented from being installed or removed on the mobile device.

Barrier 230 is the OS security barrier, also implemented on a mobile device, in which the OS of the mobile device is secured to prevent tampering with the settings of the device. This barrier prevents the inmate user from accessing the device settings GUI that is common on most mobile devices, and also prevents applications running on the device from being able to alter the mobile device settings. While in exemplary embodiments application features that may allow the application to alter the device settings would typically be disabled or removed completely in accordance with application security barrier 220, the OS barrier 230 offers a second barrier to the inmate in the event that such features are accessed. For example, if an inmate is able to bypass the application security barrier 220 by obtaining access to an unsanctioned feature of a particular application in use, the OS security barrier 230 prevents the inmate from changing or manipulating any device settings on the mobile device through the unsanctioned feature of the application.

In an embodiment, barrier 240 is the wireless security barrier, implemented on a wireless access point within the correctional facility, that detects and neutralizes mobile device wireless activity deemed unsanctioned by the correctional facility. This barrier comprises a wireless intrusion prevention (WIP) system that detects when a mobile device is attempting to either access an unsanctioned wireless access point, as embodied in wireless access point 107 of FIG. 1, or the mobile devices is itself attempting to act as a wireless hot spot. Thus, if an inmate is able to bypass the OS security barrier 230 and, for example, disconnect from a sanctioned wireless access point device to try to connect to an unsanctioned wireless access point, the wireless security barrier 240 initiates the WIP system implemented on the wireless access point to prevent the successful communication between the mobile device and an unsanctioned wireless access point.

Finally, barrier 250 is the access control security barrier, implemented on a firewall device as embodied by firewall device 120 of FIG. 1, in which a mobile device is prevented from sending to or receiving traffic from an unauthorized internet address. This barrier monitors all traffic to or from every mobile device within the correctional facility, determines if the traffic is coming to or from a trusted source outside the correctional facility, and discards any traffic that does not come from a trusted source. Thus, if an inmate is able to bypass the application security barrier 220 or the OS security barrier 230 to access a feature of an application or the OS that directs traffic to an unknown source, the access control security barrier 250 captures and discards all traffic to and from that source, thereby preventing successful communication between the mobile device and that source.

It should be noted that not all unsanctioned activity requires the bypassing of all five security barriers depicted in FIG. 2. In embodiments, there are several scenarios in which some security barriers may pose no hindrance to the unsanctioned behavior being attempted by an inmate in possession of a mobile device. For example, if an inmate desires to charge a contraband device using the battery of the mobile device, in an embodiment the inmate only needs to break through the hardware barrier 210 to gain access to a USB connector on the device, the application barrier 220, and the OS security barrier 230 to force the USB connector to allow a reverse current flow from the mobile device to the contraband device. On the other hand, to access an unsanctioned website, the inmate has to bypass the application security barrier 220, OS security barrier 230, and access control barrier 250. Thus, the five barriers of security provide redundancy in the security system that is robust in handling multiple security threats of various kinds. A single barrier would not be secure enough to handle the myriad security threats present in the correctional facility environment.

Figure 3A:
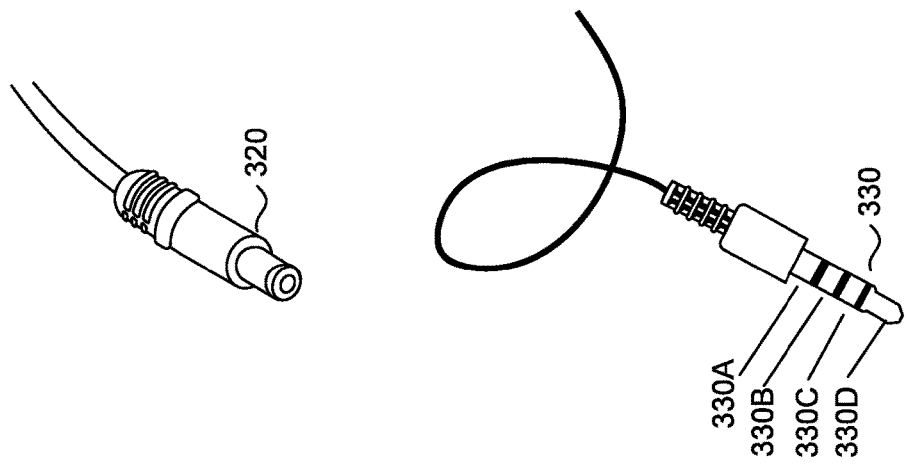
FIG. 3A-3B illustrate the hardware barrier and its relation to the mobile device, according to an exemplary embodiment of the present disclosure.
Figure 3A:
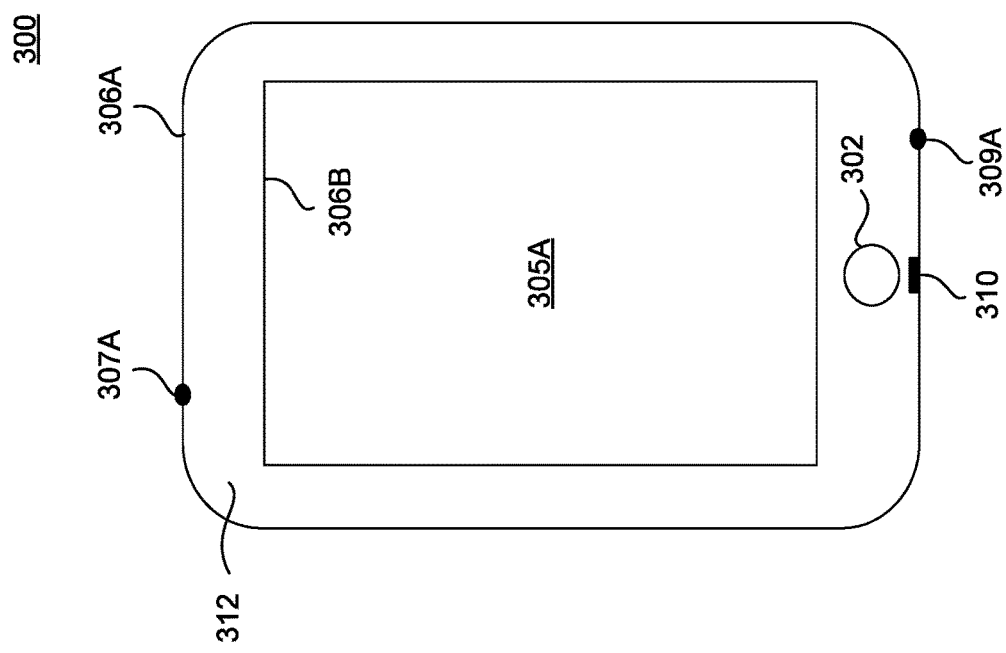

FIG. 3A illustrates the mobile device hardware 300 and connectors 320 and 330 that are authorized for that device. Device 300 is an exemplary embodiment of the hardware of mobile devices 101-103 that are illustrated in FIG. 1. The figure is intended to demonstrate the security vulnerabilities of the mobile device that exist due to the hardware of the device. The mobile device contains a screen 305A that occupies the majority of the face of the device. This screen responds to physical contact by the inmate, and typically displays, when first used by an inmate, a "home" screen where icons that represent sanctioned applications available on the device are displayed on the screen. When the icons are pressed by the inmate, the mobile device opens an application to run on the mobile device.

Typically, the mobile device face also comprises a bezel 312 that surrounds the screen on all sides, beginning at the edge of the screen 306B to the edge of the device 306A on all sides. The bezel does not respond to physical contact from the inmate, but will generally be significantly wider on one side of the device face to allow space for a button 302. In some embodiments, there are several buttons similar to button 302 implemented on the bezel of the device. Button 302 will typically function as a "home" button where, regardless of what application is being used by the inmate, pressing the button 302 will allow the mobile device to return to the "home" screen where, as described before, the icons representing programs available on the device will be displayed, allowing the inmate to choose to use a different application. Depending on application design, there is typically a way to move to the "home" screen without access to this button. This button may be either tactile response or touch-sensitive similar to the touch screen 305A.

Mobile device 300 will also typically include connector ports for various functions. Ports 307A, 309A, and 310 are all examples of ports that are implemented on a common mobile device. However, in many embodiments, additional ports may be available, and the existing ports 307A, 309A, and 310 may be placed in different areas of the mobile device 300. Port 307A is an "audio jack," otherwise known as a "phone connector", "phone jack", or "headphone jack." Port 310 is a universal serial bus (USB) port. Port 309A is a "barrel charger" for charging the battery of the mobile device.

Port 307A allows for an audio peripheral such as headphones or headphone/microphone combinations. This connector is nearly universal for mobile devices. The male connector 330 corresponds to port 307A. These peripherals allow for a device to output audio to a set of headphones to play audio directly into the ears of an inmate, or a microphone to allow for better reception of inmate speech during an audio call. While standards for the audio jack are not particularly strict, the audio jack connector 330 will typically come in one of several configurations, such as "tip/sleeve" (TS), "tip/ring/sleeve" (TRS), "tip/ring/ring/sleeve" (TRRS), and "tip/ring/ring/ring/sleeve" (TRRRS). The ring refers to the portion between two black bands as seen on connector 330. 330B and 330C would each be considered a "ring" while 330A is the "tip" and 330D the "sleeve." The addition of rings adds a new input or output interface to be added to the jack, such that it may support more services. For example, a simple TS connector may only support audio output from headphones, while a TRRS may support audio output, microphone input, and microphone button input that allows simple interaction such as pausing audio playback in a music-playing application running on the mobile device. Typically, at least a TRRS functionality is employed in most embodiments of modern mobile devices. In embodiments, the correctional facility considers this functionality allowable for inmates. In addition, certain rings of the audio jack may be disabled as deemed necessary by the correctional facility to only allow for more basic functionalities of the audio jack (e.g. allowing audio and microphone input/output interfaces while disabling the "microphone button" input).

Mobile device 300 will also typically support a universal serial bus (USB) jack 310. There are multiple forms of the USB, most commonly "micro-USB", "mini-USB" and "USB 3.0." In commercial use, this connector serves two main functions, power charging and data transfer when connected to another computing device. At least one form of this connector is implemented in nearly all mobile devices. The functioning of these ports is defined in a series of standards titled "USB 1.x", "USB 2.0", "USB 3.0/3.1", and more recently "USB Type-C". In exemplary embodiments, the correctional facility disallows use of this connector for the user by both modifying the OS kernel to disable functionality of this port, and denying physical access to the port. However, this is not limiting, and some correctional facilities may consider this port usable by inmates. Additionally, field technicians sanctioned by the ICS provider or the correctional facility may connect to this port, using proprietary computing equipment, to change settings on the mobile device.

The port 309A is the port for a connector called a "barrel charger", otherwise known as a "direct current (DC) connector" or a "coaxial power connector," and is used explicitly for charging the battery of the mobile device. The male connector 320 corresponds to port 309A. These connectors operate under several international standards such as IEC in the U.S., EIAJ in Japan, and DIN in Germany, although several other standards and proprietary implementations exist. Unlike ports 307A and 310, port 309A is not commonly implemented in mobile devices, which have opted for a USB port as embodied by 310 due to its support for data transfer as well as power charging functions. In the exemplary embodiment, the connector is added to the mobile device by the ICS provider to allow for a port that charges the battery of a mobile device but does not allow for data-related functionality that can be performed using the USB port 310. This port is therefore sanctioned by the ICS provider and correctional facility, and is the main means by which an inmate or correctional facility staff charges the mobile device.

Internal to the device, a diode is also placed in series with the barrel charger to the leads of the battery to disallow a reverse current flow. This prevents current from flowing out of the device through the barrel charger port. Without this security feature in place, an inmate is able to charge a contraband device using the energy of a well-charged battery of the mobile device.

Figure 3B:
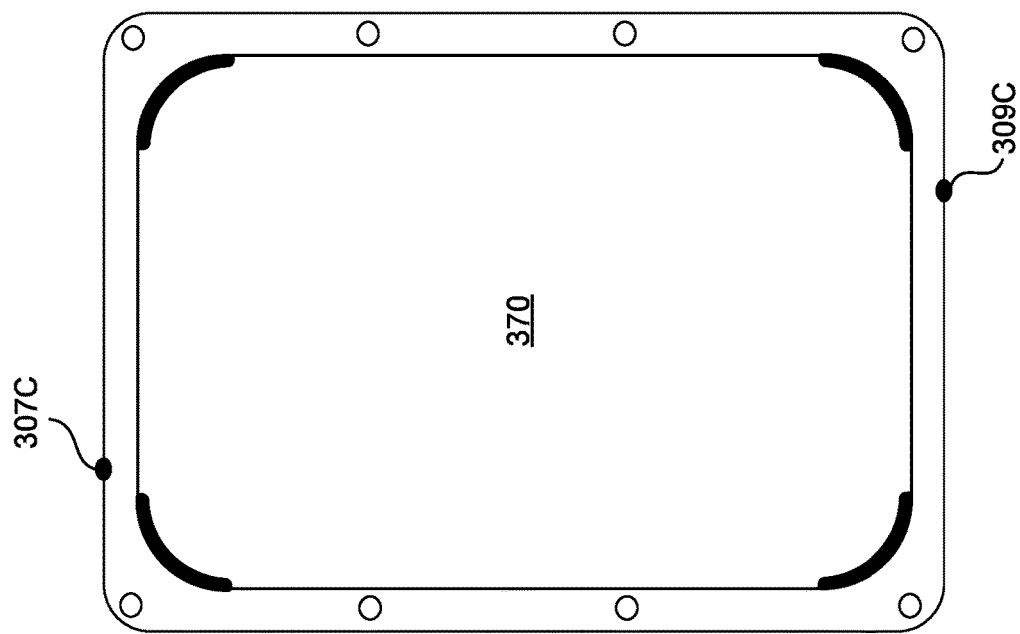
Figure 3B:
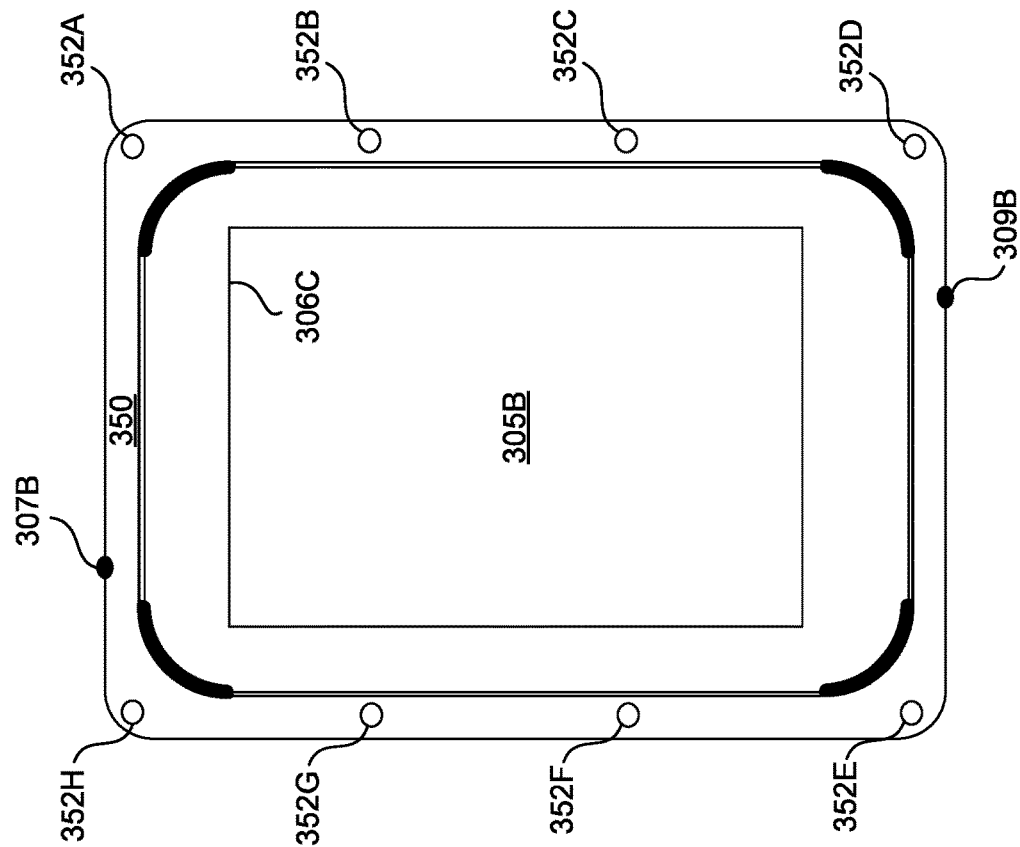

FIG. 3B illustrates an exemplary embodiment for the hardware barrier of the device, otherwise known as a "clam shell" case. The case comprises a front plate 350 which fits over the screen side of the device and a back plate 370 that fits over the back of the device. Front and back plates 350 and 370 can together be considered an exemplary embodiment of the hardware barrier 210 in FIG. 2.

In an exemplary embodiment, the front plate 350 fits over the front of the device, with a large opening 305B that exactly matches the location and dimensions of the screen. Therefore, the inner edge 306C of the front matches perfectly with the edge of the screen 306B on the mobile device. Along the outer rim of the front plate, there are 8 holes 352A-H which fit tamper-resistant screws that fasten the front plate to the back plate. The case does not allow access to the button 302 on mobile device 300, instead covering that button such that it cannot be depressed by the inmate user. The tamper resistant screws may have a screw head shape for which screwdrivers are not readily available, and the holes 352A-H are recessed such that they cannot be tampered with using conventional means such as coins, paper clips, or improvised tools by inmates.

The back plate 370 is a solid piece of plastic which contains no holes that are accessible to the user. There are 8 receptacles 352I-P that receive the tamper-resistant screws from the front plate 350. When fastened together properly, the front plate 350 and back plate 370 form a complete seal over all portions of the device, such that an inmate cannot gain access to the inner workings of the device without devising a method to separate the front and back plates from each other.

The front and back plates, when fastened, do allow for two access points to the device. 307B and 307C form a hole when the front and back plates are sealed that allows for access to the audio jack 307A of the mobile device, and 309B and 309C similarly allow access to the barrel charger port 309A. Access to the micro-USB port 310 is not allowed by the front and back plate 350 and 370. In some embodiments, the case is designed more liberally to allow for access to the USB port 310, or to allow an aerated area over speakers on mobile device 300. However, in general, the case is designed to be extremely secure and to disallow physical access to any part of the device deemed vulnerable to security threat.

Figure 4:
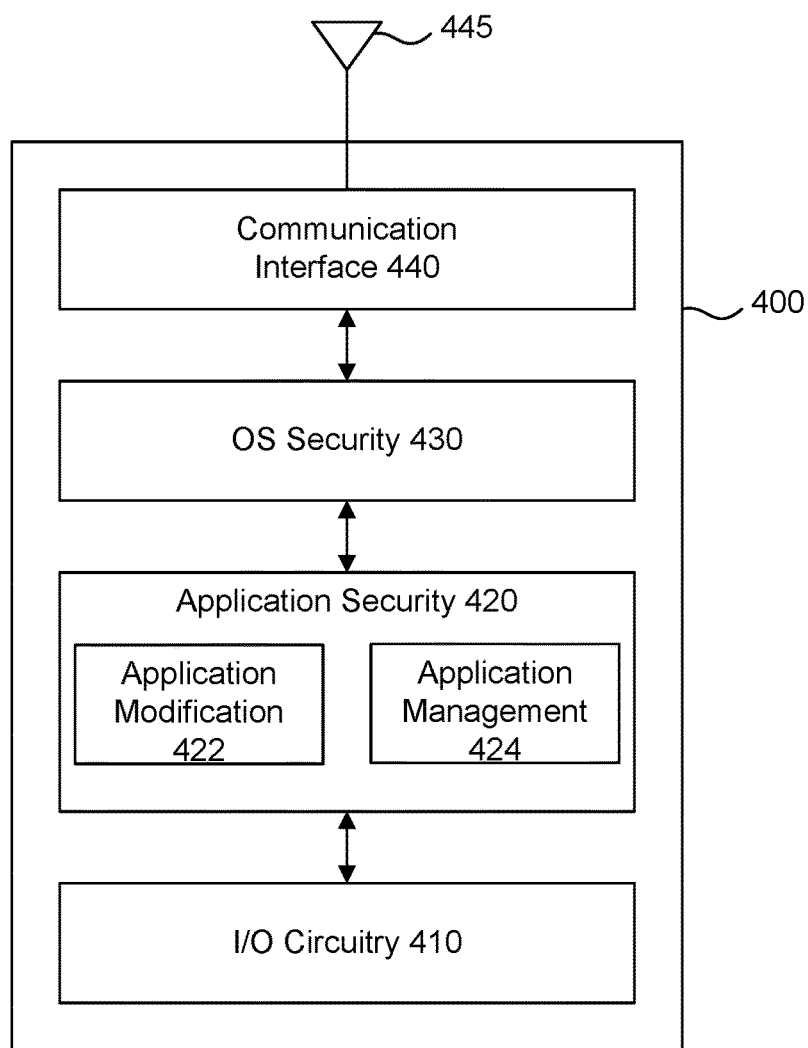
FIG. 4 illustrates the security barriers implemented on the mobile device, according to an exemplary embodiment of the present disclosure.

FIG. 4 illustrates the mobile device 400 with where application and OS security barriers have been implemented. The mobile device 400 may be an exemplary embodiment of mobile devices 101-103 as seen in FIG. 1. While the previous FIG. 3A is also an embodiment of the mobile devices 101-103, FIG. 3A is intended to demonstrate the security vulnerabilities of the mobile device due to hardware accessibility, while FIG. 4 illustrates the interaction of the security measures implemented on the mobile device software, namely the application and management security barrier 420 and OS security barrier 430. Specifically, FIG. 4 shows how the security barriers implemented on the device interact with both the user input/output (I/O) modules implemented on the mobile device and the radio of the mobile device that sends out communications.

In an embodiment, the mobile device has I/O circuitry 410 which allows the user to interact with the device. This I/O circuitry 410 includes input such as the touch screen of the mobile device as embodied by 305A of FIG. 3, the microphone, camera, and ports such as the audio jack and barrel charger jack as embodied by 307A and 309A of FIG. 3A. I/O circuitry 410 also includes as USB port, as illustrated by 310 of FIG. 3A, as well as button 302 as embodied by 302 in FIG. 3A. As noted in reference to FIG. 3B, the inmate is explicitly denied access to both the button 302 and the USB port 310 by the hardware barrier embodied by front and back plate 350 and 370 as illustrated in FIG. 3B, but if the hardware barrier is bypassed, then application management and security barrier 420 and OS security barrier 430 still neutralizes any threats that arise from inmate access to those particular I/O means.

In embodiments, the inmate interacts with the mobile device using the I/O circuitry 410. As described with reference to FIG. 3A, this interaction will mainly take place in the form of initiating and interacting with applications on the touch screen. The application management and security barrier 420 monitors these interactions to ensure that no unsanctioned activity can be initiated via any applications that the inmate is otherwise authorized to use.

In embodiments, commercially available applications often provide functionalities that are superfluous to their main function and provide means for circumventing security monitoring in a controlled-environment setting. For example, some applications provide a simple web browser functionality that is initiated when a user selects a particular action. This provides a means of escaping IP address or domain name filters implemented on the mobile device to prevent certain internet content from being accessed by the inmate. Other applications whose main goal is not social interaction nonetheless provide basic social interaction functions such as commenting, rating functions, interactive messaging/chatting features, and voice/video chat. These functionalities provide means for inmates to engage in clandestine communications that evade security monitoring. In general, extraneous functions provided by a commercially available application provide possible means for circumventing correctional facility rules. Additionally, many commercial applications make ad-hoc changes to settings in the mobile device that may be unsanctioned by the correctional facility. An application, for example, can attempt to make changes to WiFi settings, turn on a Bluetooth radio, or turn on the GPS radio of the mobile device. This too may evade security monitoring.

Given the broad range of threats inherent in applications, in embodiments, the application security barrier 420 takes two approaches. The first approach is application modification 422, in which applications that are considered useful for inmates are first stripped of any application features which are considered to be security vulnerabilities by either the ICS provider or the correctional facility. The ICS provider may also provide applications for allowable social interactions where the ICS programs in the ability to monitor the use of those applications. This monitoring may occur at the call processing center, such as call processing center 150 depicted in FIG. 1. There, data traffic that travels to and from that application can be monitored to determine if any illicit activity is occurring.

The second approach to the application security barrier 420 is the application management 424. This module disallows the addition or removal of any applications currently on the device, as well as modifications of settings on applications considered important to the security of the device. By disallowing inmates to install new applications on the device, the inmate is prevented from gaining access to new applications that have unforeseen means of performing illicit activity that are not be detectable by the ICS provider. By preventing the removal of applications by the inmate, security-related applications in particular are prevented from being removed from the device. The module also detects attempts by the user of the mobile device to use a function on an application that is unsanctioned by the correctional facility. In such cases, the module will attempt to prevent the function from being executed by the mobile device processing circuitry. In embodiments, when such activity is detected, the application security barrier 420 also sends a notification to the call processing center such that ICS or correctional facility personnel may be notified of such activity.

In embodiments, if application security barrier 420 is bypassed, the OS Security barrier 430 acts as the next security barrier in preventing inmates from engaging in illicit activity. Some discussion of an OS is warranted here to convey the importance of OS security barrier 430. The main element of an OS is a "kernel", a software module that controls the interaction between applications and the mobile device hardware. The kernel serves several functions, including reserving processing resources in which the application executes its functions, and acting as the interface between the application and the hardware devices on the mobile device. These hardware devices include the general I/O such as the touch screen and any tactile buttons on the mobile device, mobile device radios such as WiFi, and cellular radios, and hardware interfaces such as the USB port 310 or the audio jack 307A as shown in FIG. 3. These interfaces are shown as communication interface module 440 in FIG. 4. Connected to communication module 440 is an antennae 445. In embodiments, antennae 445 may be one or more antenna that serve the multiple wireless interfaces listed above.

Consider the following example. An application desires data from a network connection served over a wireless interface such as Bluetooth, and also GPS coordinates from the GPS radio. The application sends requests called "system calls" to the kernel that specify actions desired by the application, and the kernel performs the necessary translations to fulfill those system calls. In this example, the kernel engages the Bluetooth radio to send and receive data, the GPS radio to receive GPS coordinates, and the processor and memory to allow the application to temporarily store the data received by the Bluetooth and GPS radios. As such, the OS, and the kernel in particular, provides a key point for ICS providers to implement security features on the mobile device.

In embodiments, the OS security barrier 430 prevents the inmate from accessing settings of the device that controls the communication interfaces 440. In common implementations of commercially available OS, the device settings are directly accessible from the home screen as an icon similar to an application icon. This icon, and any underlying GUI that allows for easy mobile device setting changes, is removed from the mobile device. In particular, the OS barrier prevents the access to the WiFi settings to prevent the inmate inputting a non-sanctioned access point service set identifier (SSID) and passcode, such as access point 107 depicted in FIG. 1, into the mobile device. The passcode may be in the form of a wired equivalent privacy (WEP), WiFi Protected Access (WPA) or WiFi Protected Access 2 (WPA2) key. The OS barrier detects attempts by the inmate to toggle radios on and off in the mobile device, such as the WiFi, Bluetooth, or cellular radios. The access icon to settings from the operating system environment is removed, thereby preventing the one-click access to these settings. It also detects attempts by an application to make these device settings changes, such as a radio being switched on to perform an function specific to the application.

Furthermore, the OS barrier 430 also prevents the surreptitious access of the mobile device settings through applications whose security barriers have been bypassed. In many commercially available applications, a common feature allows the application to access mobile device settings directly. A common example is a map application that seeks to automatically switch on the mobile device's GPS radio when the device is engaged. In cases where the application security barrier 420 is bypassed, or simply omitted due to an oversight by the ICS provider, the application attempts to access mobile device settings, thereby allowing the inmate to change these mobile device settings. The OS barrier, at the kernel, prevents applications from accessing the mobile device settings.

Another key feature of the OS security barrier 430 is to prevent devices that have been plugged into the available ports of the mobile device, such as USB port 310 or the audio jack 307A depicted in FIG. 3, from accessing or changing the mobile device settings. In the event that the hardware barrier, such as that depicted in FIG. 3B, is bypassed, the OS security barrier 430 also prevents peripheral devices that are plugged into the available ports on the mobile device from interacting with the applications or the settings of the mobile device. In embodiments, when such activity is detected, the OS security barrier also sends a notification to the call processing center such that ICS or correctional facility personnel may be notified of such activity.

While it is desirable to prohibit the inmate from changing settings or manipulating applications on the device, the ICS provider still requires access to the device settings to make various operational changes. In embodiments, the ICS provider uses an over-the-air (OTA) update functionality to access a mobile device's setting. In OTA applications, mobile device settings and application changes can be made through wireless transmission to the devices. Several applications exist that provide this functionality, where the application initiates a background process "daemon" at the mobile device startup which recognizes specific data types and commands received wirelessly. Using the OTA method, the ICS provider can send settings changes directly to mobile devices without any interaction from the inmate, such as updating a WiFi SSID or password, installing, updating, or deleting applications, or initiating other operating system updates.

In an embodiment, the other way ICS providers changes settings is by physical access to the device, wherein a terminal such as a laptop can be linked directly to the mobile device using the USB port such as 310 in FIG. 3. Though settings icons and GUIs are removed as part of the OS security barrier 230, the terminal implements software that allows access to the underlying operating system software on the mobile device to make changes as necessary. As with OTA updates described above, the operator of the terminal makes changes to the mobile device settings, install or otherwise update applications on the device, or initiate operating system updates.

The mobile device 400 may also be fitted with a radio frequency identification (RFID) tags. RFID tags typically work in concert with an RFID reader, which sends an interrogating signal that prompts an RFID tag to send identifying information back to the reader. In an embodiment, RFID tags tied to the mobile device may emit an identification (ID) signal to an interrogating RFID reader. RFID tags typically are associated with an electronic product code (EPC) that contains a protocol, organization, and serial number component that is unique for each RFID tag. RFID tags may be either active or passive, meaning that they possess or lack a power source, respectively. Active RFID tags are capable of more complex security mechanisms to protect the communications between RFID tag and reader.

RFID readers may be placed throughout the correctional facility in a way that allows each reader to cover all tags within a highly defined area. For example, one or more RFID readers can be placed in a particular location of a facility, such as a cafeteria, a cell block, or a courtyard, and can send interrogating signals to all mobile devices equipped with RFID tags. The RFID tags then respond with the identifying information signified in their EPC, where this code can be checked against the known codes that have been utilized by the correctional facility to track their mobile devices. There are numerous ways in which RFID tags affixed to mobile devices and RFID readers can be used to add additional security to the mobile devices.

In an embodiment, an RFID tag with its associated EPC is paired with a particular device having an associated MAC address. If no RFID reader detects the reader, a signal can be sent to correctional facility administrators that a particular mobile device appears to not be within the facility grounds, and corrective steps can be taken to locate the device, question the inmate that the device has been issued to, and so on. In another embodiment, a mobile device's RFID tag may communicate with an RFID reader in an area of the facility that either the mobile device or the inmate issued the mobile device has not been permitted to occupy. In such cases, correctional facility administrators may be informed so that corrective actions can be triggered, such as searching the area of the facility in which the device was detected, questioning the inmate in possession of the device, and so on.

Other security layer may also utilize the information obtained by RFID readers to activate security protocols against the mobile device. In one embodiment, the wireless security layer 240 may be utilized to attack the mobile device using the mobile device's associated MAC address, as is detailed FIG. 5. In another embodiment, a firewall device implementing the access control barrier 250 may be informed of the mobile device's location violation, and disregard all traffic transmitted to and received from that device, as detailed further below with respect to FIG. 7.

A key security issue with RFID tags is that they are can be easily cloned if proper security steps are not taken. Because a basic EPC may amount to nothing more than a permanently fixed bit string, care must be taken by correctional facility administrators to prevent nefarious parties from mimicking the signal of a particular RFID tag. This can be accomplished through various forms of encryption that allow RFID readers and RFID tags to communicate securely.

Figure 5:
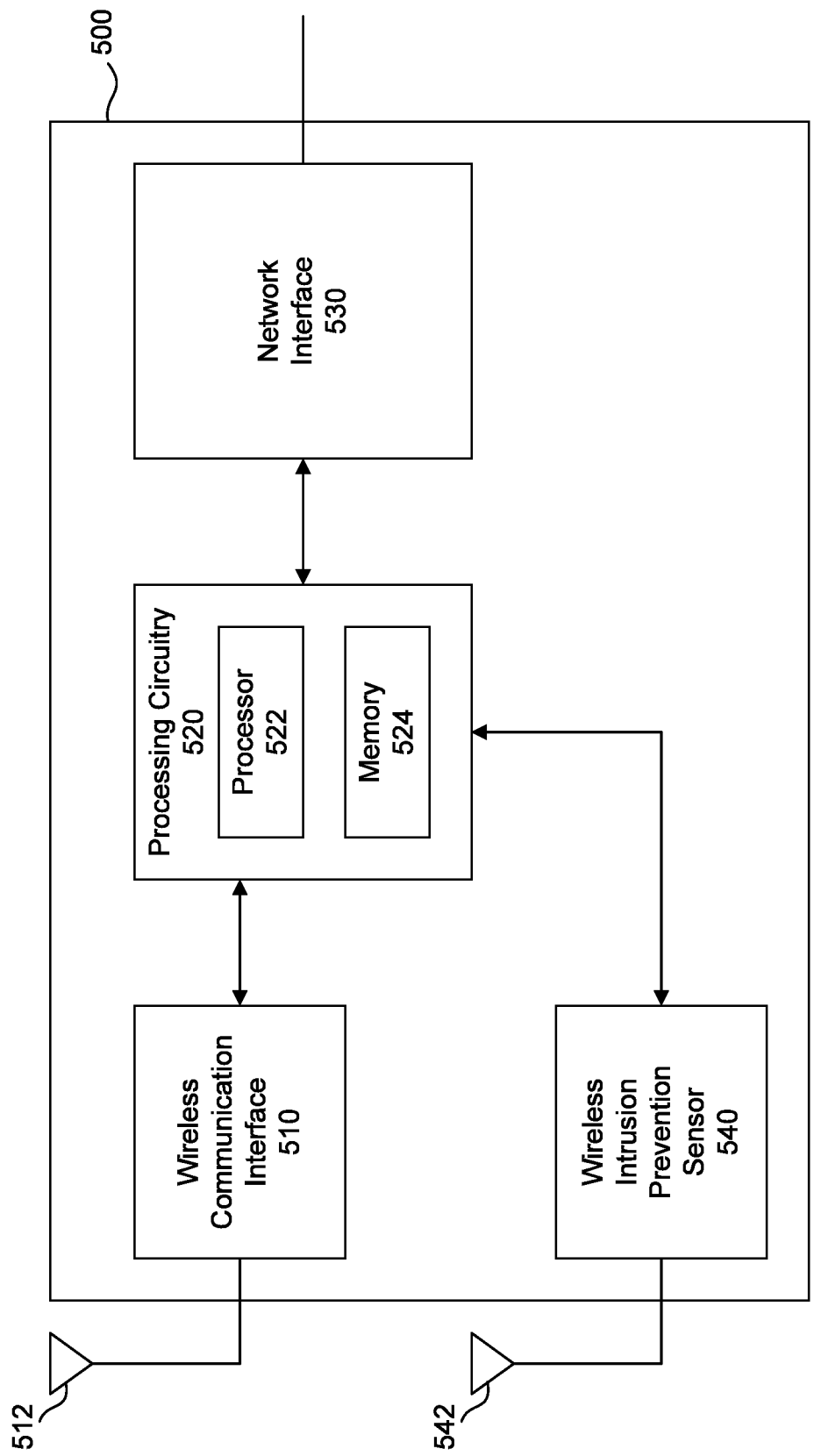
FIG. 5 illustrates the functional elements of a wireless access point, according to an exemplary embodiment of the present disclosure.

FIG. 5 illustrates a wireless access point 500. Access point 500 may be an exemplary embodiment of the access points 104-106 depicted in FIG. 1. The wireless access point 500 demonstrates an exemplary embodiment of the wireless security barrier 240 as seen in FIG. 2. The wireless access point is made up of a wireless communication interface 510 and antennae 512 coupled to the communication interface, processing circuitry 520 comprised of processor 522 and memory 524, network interface 530, and wireless intrusion prevention sensor 540 and antennae 542 coupled to the wireless intrusion prevention sensor. The wireless intrusion prevention sensor 540 and antennae 542 allow the wireless access point to carry out the functions of the wireless security barrier 240, while the other components serve to allow the access point 500 to serve data to and from the mobile devices, such as 101-103 in FIG. 1.

As discussed above, the wireless access point 500 serves data wirelessly to the mobile devices 101-103. This device will typically operate under a version of the IEEE 802.11 "WiFi" protocol that allows a bi-directional link between the access point 500 and multiple mobile devices. The wireless communication interface 510 and accompanying antennae 512 allow access point 500 to communicate wirelessly with the mobile device. The processing circuitry 520, with component processor 522 and memory 524, are programmed to allow the access point to execute instructions in accordance with the WiFi protocol. The processing circuitry also carries and executes operations in accordance with the wireless intrusion prevention sensor 540 to form the wireless security barrier 240, as will be discussed in further detail below. Finally, the network interface 530 is the wireline interface that connects the access point 500 with a wider outside network, such as a LAN, WAN, or the internet. This connection serves as the backbone connection to the data networks and VoIP networks which serve data to and from the mobile devices 101-103. Typically, this interface will operate in accordance with the IEEE 802.3 "Ethernet" protocol.

In an embodiment, the wireless intrusion prevention sensor (WIPS) 540 and antennae 542 enable the wireless access point 500 to implement wireless security barrier 240. In scenarios where the inmate has managed to bypass the application and OS security barriers 220 and 230 as depicted in FIG. 2 and discussed in greater detail relative to FIG. 4, an inmate gains access to the mobile device WiFi settings and engage in any number of unsanctioned behaviors. WIPS 540 and antennae 542 are designed to detect transmissions indicative of these unsanctioned behaviors and transmit signals to block the unsanctioned behavior from being engaged successfully by the inmate.

Figure 6B:
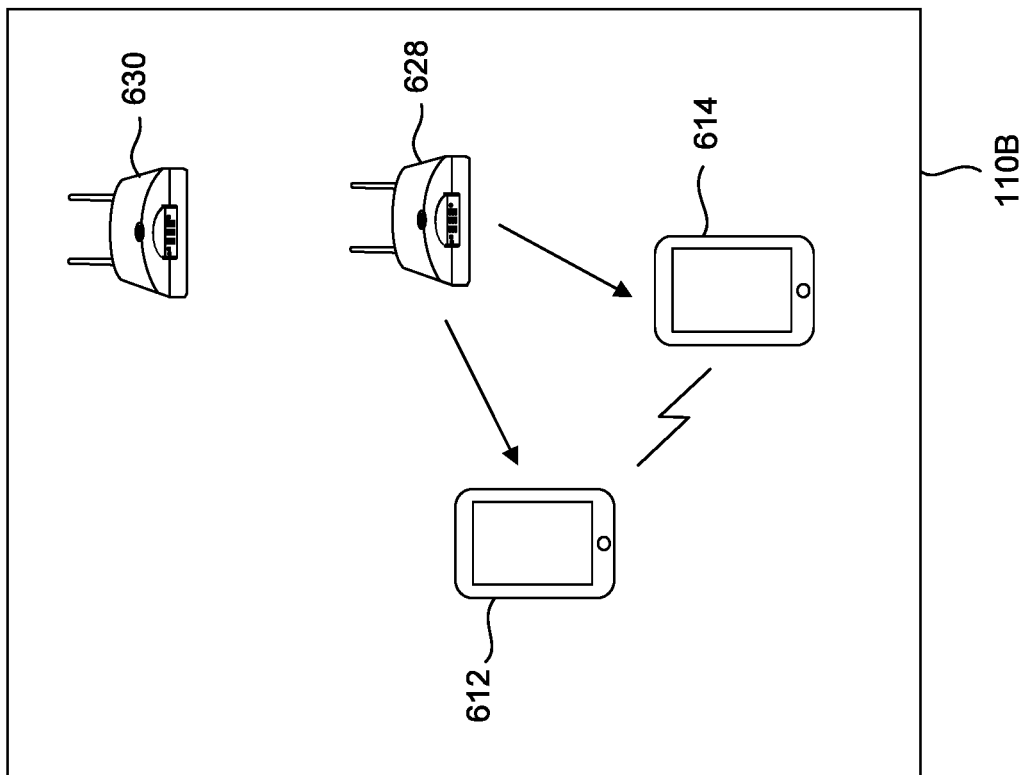
FIG. 6A-6B illustrate two scenarios of wireless intrusion, according to exemplary embodiments of the present disclosure.
Figure 6A:
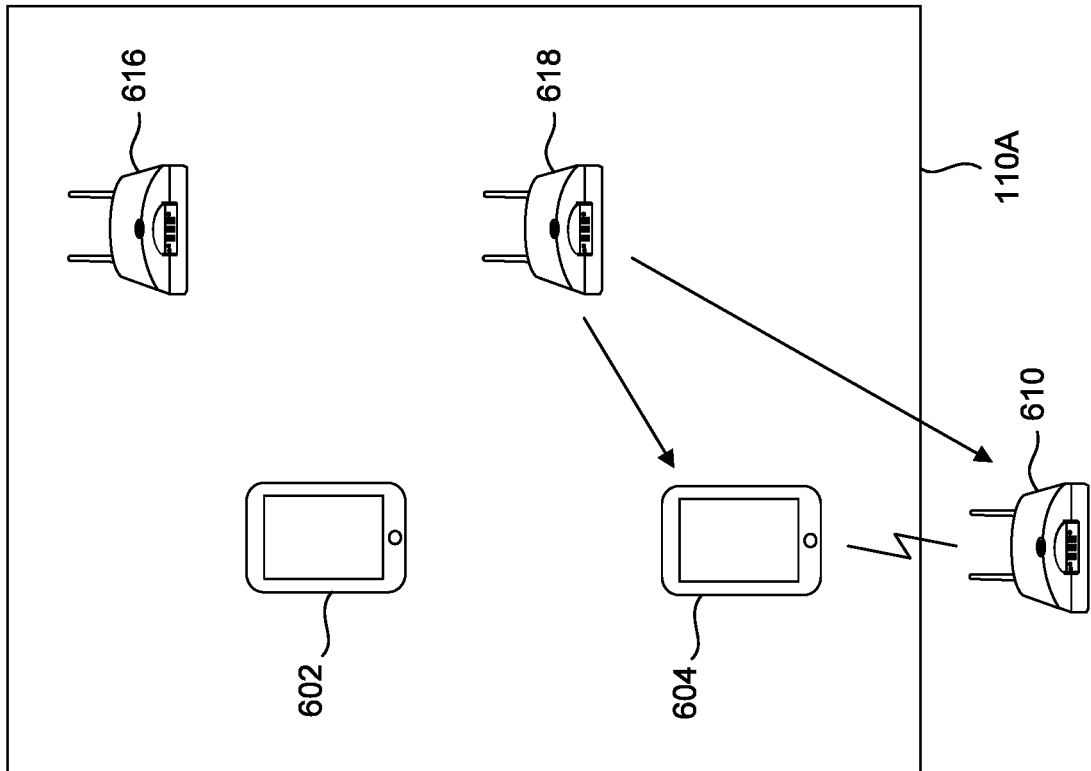

The two key situations are depicted in FIGS. 6A-6B. Both figures depict a scenario within a correctional facility in which the application and OS security barriers have been bypassed by the inmate in some fashion. Specifically, in FIG. 6A, mobile device 604 has bypassed the application and OS security barriers 220 and 230 to gain access to the WiFi settings in mobile device 604, and has connected to an unsanctioned wireless access point 610 outside of the correctional facility 110A. In such a case, the wireless access point 618 within the correctional facility 110A equipped with a WIPS system would detect the activity and attack mobile device 604 to prevent it from engaging successfully in the unsanctioned activity. The WIPS system also attacks the outside wireless access point device 610 if that device is determined to be an unsanctioned wireless access point that is established near the correctional facility.

In FIG. 6B, a different scenario occurs in which an inmate in possession of mobile device 612, having bypassed the application and OS security barriers 220 and 230, gains access to the WiFi settings of the mobile device and begins behaving like a WiFi hot spot. Mobile device 612 forms wireless connections with another mobile device 614 to connect with and begin serving data to. This allows mobile devices 614 to engage in unsanctioned activity as well. In such a case, the wireless access point 628 within the correctional facility 110A equipped with a WIPS system would detect the activity and attack mobile device 604 to prevent it from engaging successfully in the unsanctioned activity.

Returning to FIG. 5, in an exemplary embodiment, the wireless access point 500 stores in memory 524 a MAC address white list which contains the MAC addresses for all of the mobile devices issued by the prison which are authorized to access the correctional facility network. In an embodiment, the device also stores a MAC address black list of devices which are explicitly prohibited from accessing the network. The wireless access point 500 also stores a list of known wireless access point service set identifiers (SSIDs) that the ICS provider, correctional facility, or other authority recognizes as a valid network near the correctional facility. This list contains SSIDs of neighboring wireless access points, such as those that are deployed in nearby office buildings, businesses, etc. that are near the correctional facility.

WIPS 540 is capable of detecting when unsanctioned activity related to the initiation of WiFi connections occurs. In embodiments, a typical wireless access point is associated with a SSID and a wireless media access control (MAC) address. Any mobile device connecting to a wireless access point will also have a MAC address. When a mobile device attempts to connect to a wireless access point, the wireless access point advertise its SSID (and in some embodiments its MAC address) while the mobile device also exposes its MAC address. The WIPS 540 and accompanying antennae also receives the MAC address and SSID information and make a decision to perform an intervention if any of this information indicates illicit behavior on the part of an inmate within the correctional facility.

If the WIPS 540 detects such unsanctioned behavior, it can use the information of the SSID, access point MAC address, or mobile device MAC address to attack the device engaged in the unsanctioned activity to prevent that activity from being successful. The WIPS 540 attack is through a deauthentication denial of service attack. In this attack, the WIPS 540 and antennae 542 repeatedly sends deauthentication frames to the device engaged in the unsanctioned activity. By "flooding" the target device with these frames, the WIPS can essentially render the target device inoperable due to the target device's attempt to process these frames. The examples of FIGS. 6A and 6B are exemplary embodiments of situations in which a mobile device bypasses the application and OS security barriers and gain access to the WiFi device. In embodiments, when such activity is detected, the WiFi device also sends a notification to the call processing center such that ICS or correctional facility personnel may be notified of such activity.

In FIG. 6A, mobile device 604, having been compromised by the inmate that possesses it, disconnects from a sanctioned wireless access point, such as 616 and 618 within the correctional facility 110*a*, and attempts to connect with a wireless access point 610 outside the correctional facility. The wireless access points 616 and 618, having been provisioned by the ICS provider, are equipped with WIPS systems as embodied by WIPS 540 in access point device 500. When the mobile device 604 and wireless access point 610 exchange messages during common WiFi authentication procedure, the WIPS sensors on one or both of the wireless access point 616 and 618 detect the MAC address of the mobile device 604 and recognizes the device as a mobile device issued by the correctional facility 110*a*, and detects that it is attempting to authenticate with a wireless access point 610 that is not provisioned within the correctional facility 110*a*. Note that wireless access point 610 is on the whitelist of recognized outside wireless access points. In such cases, this wireless access point 610 would be ignored by the WIPS system of any of the wireless access points within correctional facility 110*a* so long as they were not engaged in any activity with a mobile device issued by the correctional facility.

At this point, the wireless access point 618 determines that the behavior is unsanctioned, and attacks the mobile device 604 using a deauthentication attack as described above. If the wireless access point 610 is not found on the whitelist of acceptable outside wireless access points based on its SSID or MAC address, the wireless access point 618 also attacks the wireless access point device 610 using a similar deauthentication attack. It should be noted that in some embodiments, the wireless access point 610 could also be a wireless access point that an inmate has snuck into the correctional facility. The WIPS system would not distinguish between these situations, and would attack this wireless access point as long as it was not on the access point whitelist as described above.

In FIG. 6B, mobile device 612 disconnects from a sanctioned wireless access point such as access point 628 or 630 within correctional facility 110B. In this embodiment, mobile device 612 begins functioning as a wireless hot spot, wherein the device 612 essentially behaves like a typical wireless access point using the IEEE 802.11 protocol and form WiFi wireless connections with other devices. Another mobile device 614 within the facility then forms a wireless WiFi connection with 612. In such a case, the WIPS system of the wireless access point 628 would detect the device 612 either through its SSID or MAC address and use a deauthentication attack as described above against the mobile device 612. Additionally, it may attack mobile device 614 because it detects that this device is issued by the correctional facility and is attempting to access a wireless access point (in this case mobile device 612 behaving as a WiFi hot spot) that is not recognized by the facility.

Figure 7:
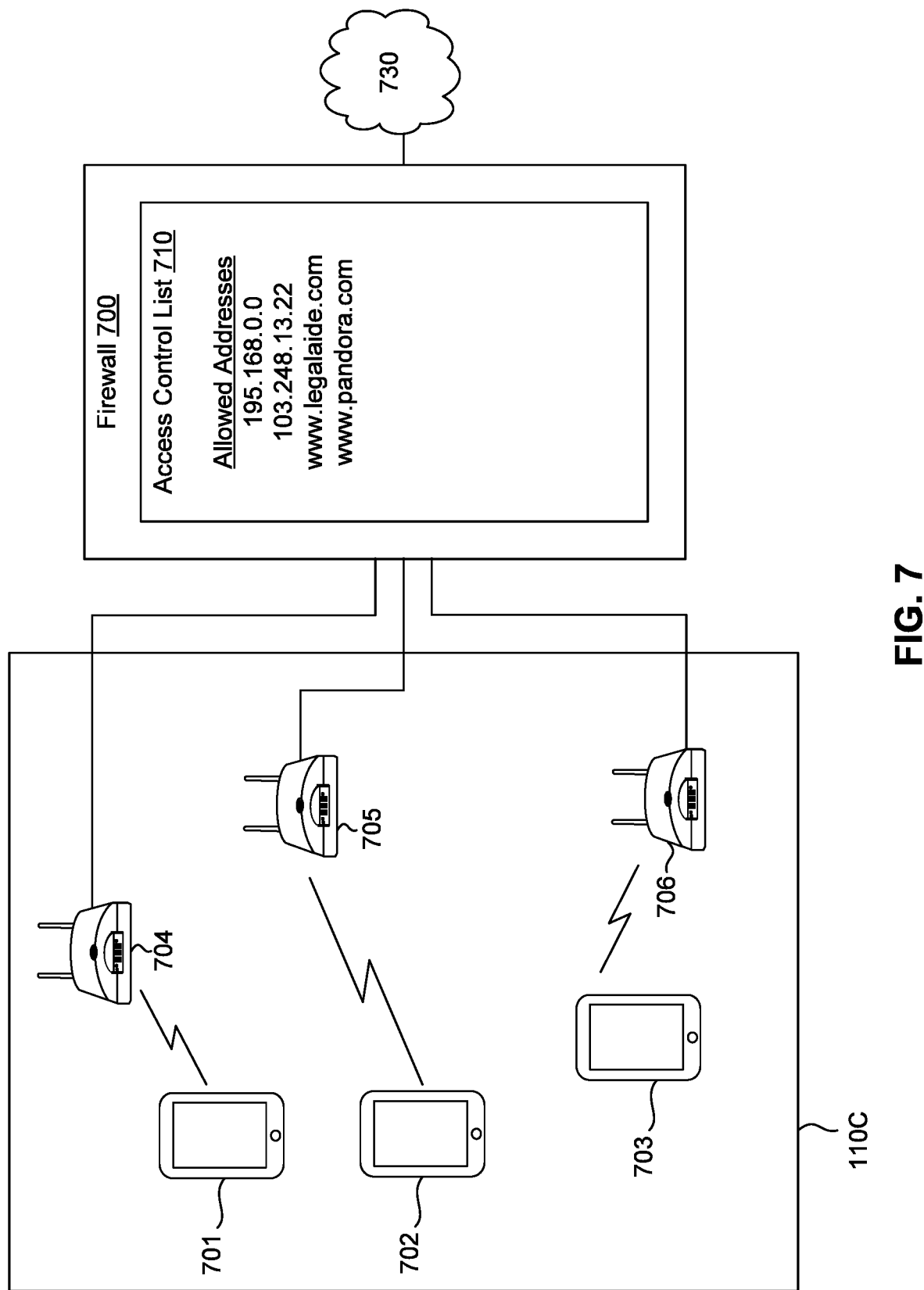
FIG. 7 illustrates the firewall and its relation to the other network elements, according to an exemplary embodiment of the present disclosure.

FIG. 7 depicts the firewall 700 that implements the access control security barrier. Firewall 700 may be considered an exemplary embodiment of the access control security barrier 250 as depicted in FIG. 2. FIG. 7 depicts the firewall 700 in relation to a correctional facility 110C. In embodiments, the firewall 700 may be implemented on existing router hardware in network 730 or in dedicated hardware that can implement "fully qualified domain name" (FQDN) filtering. This distinction will be fully discussed below. In an embodiment, the correctional facility 110C contains several mobile devices 701-703 issued by the correctional facility, along with wireless access points 704-706 that are placed throughout the correctional facility by the ICS provider. These wireless access points 704-706 may be implementations of wireless access point 500 that include a wireless intrusion prevention sensor 540 and antennae 542 as depicted in FIG. 5. The wireless access points 704-706 serve to connect mobile devices 701-703 with applications and services requiring network connectivity that are sanctioned by the correctional facility.

In an embodiment, the wireless access points have wireline connections to the firewall 700, which then connects to the network 730. Network 730 may be an embodiment of network 130 as depicted in FIG. 1. The wireless access points, as discussed relative to FIG. 5, are connected to other routing and switching devices, including a firewall 700, via high bandwidth wireline connections operating on existing protocols such as IEEE 802.3 Ethernet protocol. The firewall 700 implements an access control list 710 that contains lists of allowable internet protocol (IP) addresses that are allowed to communicate with the mobile devices. Network 730, as described previously, consists of routers and switches running well-known protocols such as IEEE 802.3 "Ethernet" protocol. The network may be owned and provisioned by the correctional facility 110C, the ICS provider, or may be part of a public network such as the internet. The network 730 then connects to a call processing center controlled by the ICS provider, as depicted in FIG. 1 (150).

Thus, in the architecture shown in FIG. 7 (and FIG. 1), any data traffic that is sent or received by the mobile devices 701-703 is routed through the firewall 700. The access control list 710 lists the allowable IP addresses and/or web domains that are allowed to exchange data with the mobile devices issued by the correctional facility. Since all data traffic to or from the mobile devices passes through the firewall 700, the firewall device engages in packet inspection operations that can determine the IP addresses and/or the web domains of each individual packet. If the firewall device detects packets that are not addressed to or from the list of IP addresses or web domains contained on the access control list 710, the firewall device can simply discard the packets without allowing them to travel to their intended destination. In embodiments, when such activity is detected, the firewall may also send a notification to the call processing center such that ICS or correctional facility personnel may be notified of such activity. This alert may contain identifier information of the mobile device engaging in the activity such as the MAC address, the SSID or other identifier information of an unsanctioned WiFi hotspot, or otherwise.

Thus, the firewall 700 and its access control list 710 form the final security barrier between the mobile devices 701-703 and the outside world. In situations in which the inmate in possession of the mobile device has managed to bypass the application and OS security barriers by gaining access to an unsanctioned application or function which allows them to attempt to communicate with an unsanctioned website or IP address, any traffic routed through the ICS provider system will be routed necessarily through the firewall 700. This may happen if an application is installed on the mobile device which has a web browser function, or if an existing application is hacked. Thus, firewall 700, detecting traffic directed to or from unsanctioned addresses, discards any such traffic before it reaches the inmate or the unsanctioned address. It should be noted, however, that in embodiments the access control barrier embodied by firewall 700 does not serve as a security barrier for certain types of unsanctioned activity. For example, if a mobile device manages to connect to an outside wireless access point, as depicted in FIG. 6A, the traffic between the mobile device and outside wireless access point is not subject to the packet inspection and filtering operations of the firewall 700.

For clarity, the firewall 700 is depicted as a separate device, but depending on the scope of the access control list 710, may in fact be implemented on existing router hardware in the network 730. For example, if the access control list is made up entirely of Internet Protocol version 4 (IPv4) addresses, which are made up of four 3-digit numbers separated by periods such as "195.168.0.0" seen in FIG. 7, then the access control list 710 may be implemented directly on the routers of network 730, and as such would not require a fully separate firewall 700. However, if a correctional facility sanctions access to website domains for a particular service, such as a law-related website called "www.legalaide.com" as seen in FIG. 7, the access control list requires a fully qualified domain name (FQDN) firewall which is implemented on dedicated hardware. In such cases, the firewall 700 would indeed be a separate entity from the routers and switches comprising the network 730. Simply put, for the firewall 700 to satisfy the requirements of access control barrier 250 is that all data traffic to or from the mobile devices must be passed through devices that can implement the packet inspection and discarding operations described above. Even in cases where correctional facilities only require an access control list 700 comprised of only IPv4 addresses, a separate firewall 700 may be desired due to the significantly more flexible and customizable nature of the hardware in implementing an access control list.

Figure 8C:
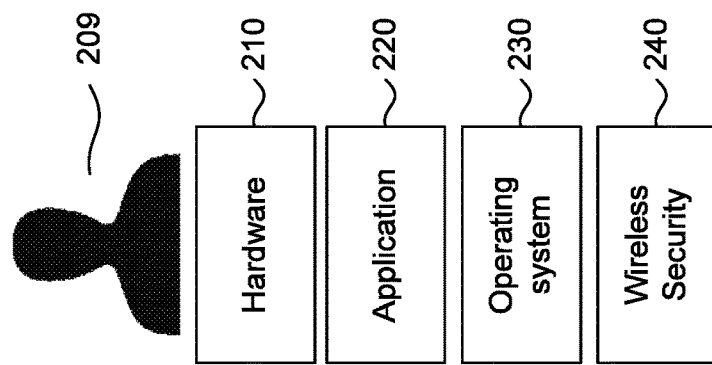
FIG. 8A-8C illustrate the operative security barriers for different scenarios, according to an exemplary embodiment of the present disclosure.
Figure 8B:
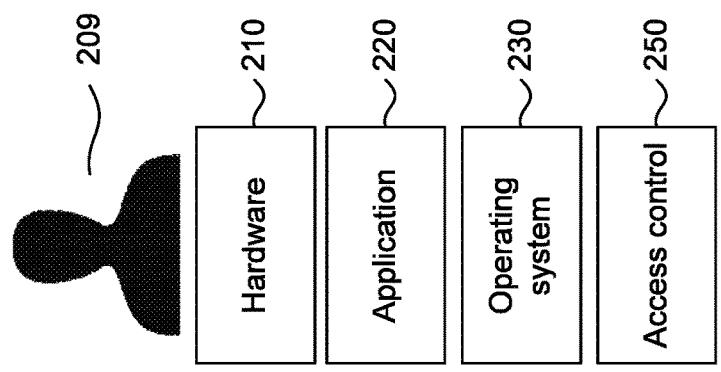
Figure 8A:
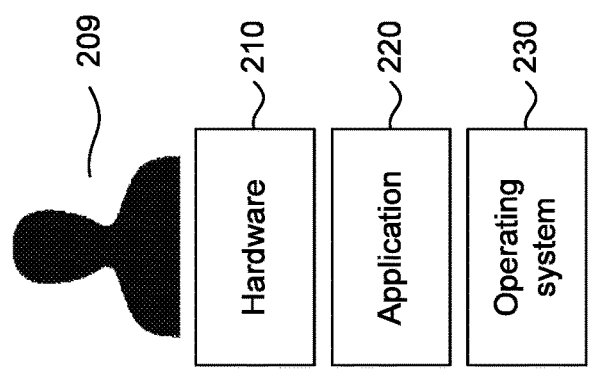

FIG. 8A-C illustrate the security barriers that an inmate may need to bypass in order to engage in three different types of unsanctioned behavior. As is demonstrated, not all security barriers are operative depending on the type of unsanctioned behavior the inmate wishes to engage in, but the multiple security barriers interact together to provide a robust security suite in all scenarios. It should be noted that these figures are meant to be illustrative, and in no way represent the entirety of unsanctioned behaviors or security breaches that an inmate may wish to engage. In the embodiment depicted in FIG. 8A, the inmate 209 desires to charge a contraband device using the power source of the mobile device. In order to gain access to the battery of the mobile device and allow for a reverse current to travel from the battery to the contraband device, the inmate would have to bypass the hardware barrier 210 by either opening the mobile device case (350 and 370) to gain access to USB connector port (310) or manipulating the barrel connector diode (such as 309A as depicted in FIG. 3A) to allow a reverse electrical current. The inmate then must bypass both the application and OS security barriers 220 and 230 to change the settings of the USB connector port 310 to allow a reverse electrical current to travel from the mobile device to the contraband device. If inmate 209 managed to bypass these three barriers, the inmate is able to charge the contraband device. Notice that, because the goal of the security breach is to charge a contraband device, the wireless security barrier 240 and access control list barrier 250 do not pose any hindrance to the inmate 209.

In the embodiment depicted in FIG. 8B, the inmate 209 wishes to access an unsanctioned social network website. In order to engage in this behavior, in embodiments the inmate 209 has to bypass the hardware security barrier to connect a peripheral device to the mobile device. The inmate 209 has to also bypass the application security barrier in order to either install an application not yet installed on the mobile device or change an existing application on the mobile device to allow the inmate to use a web browser. The inmate may also need to bypass the operating system security barrier 230 in order to install applications on the mobile device. Finally, if the inmate manages to break all barriers of security localized on the mobile device, the access control list barrier 250 still needs to be bypassed in order to send between the mobile device and the unsanctioned destination. Notice, however, that the wireless security barrier 240 is not present in the security barrier stack. This is because typically the wireless access point that implements the wireless security barrier 240 does not necessarily have the functionality to perform packet inspection. As such, this barrier may pose no hindrance to the inmate 209 in this particular scenario. However, in other embodiments, more advanced wireless access points may be capable of packet inspection and packet discarding.

Finally, in FIG. 8C, the inmate 209 may wish to disconnect the mobile device from its sanctioned wireless access point within the correctional facility and connect to an outside wireless access point. This scenario is also described with reference to FIG. 6A. In this scenario, the inmate 209 may need to bypass the hardware security in order to connect a peripheral device to the mobile device via the USB connector port such as port 310 in FIG. 3A, then bypass both the application and OS security barriers 220 and 230 to gain access to the wireless settings of the mobile device. Once those barriers are bypassed, meaning that the inmate 209 has managed to change the mobile device wireless settings in order to attempt to connect to an unsanctioned wireless access point, the wireless security barrier 240 implemented on a sanctioned wireless access point detects this breach and attack the mobile device and potentially the outside wireless access point with a deauthentication attack as described above with reference to FIG. 5, FIG. 6A, and FIG. 6B above. Notice that in this case the access control barrier 250 is not a hindrance to inmate 209 because the firewall that implements the access control list of barrier 250 does not filter the traffic of a wireless access point outside of the correctional facility.

In all three cases, different barriers of the security suite 200 due to the nature of the unsanctioned activity attempted by the inmate 209. This demonstrates the need for and interplay between the security barriers 210-250—not all barriers are capable of providing security against all types of security bypass attempts, but several barriers hinder any single security bypass attempt.

Figure 9:
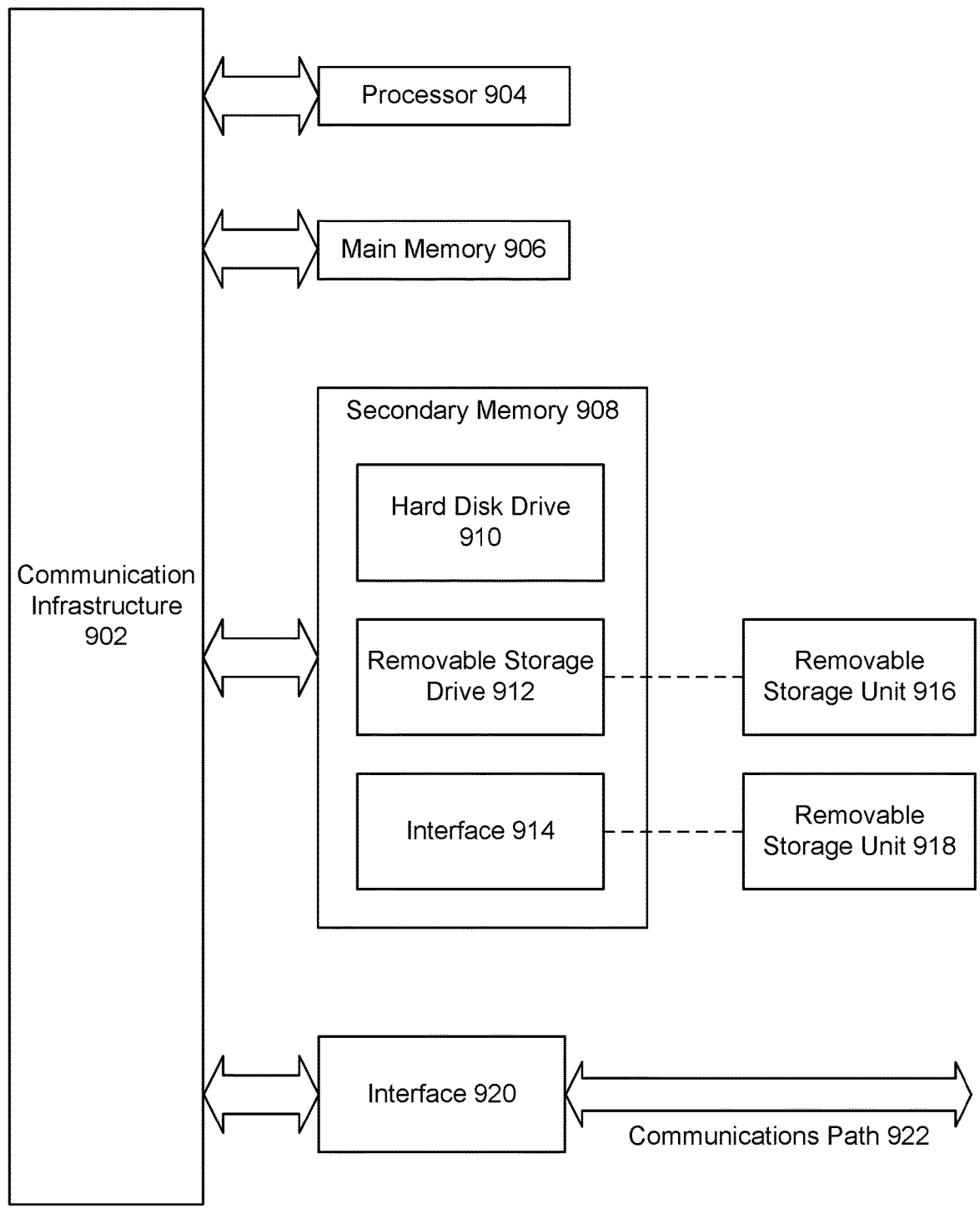
FIG. 9 illustrates a computer system, according to an exemplary embodiment of the present disclosure.

FIG. 9 depicts a computer system 900 which can be used to implement It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIGS. 5-6 can be implemented in the environment of one or more computer systems or other processing systems. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A system for preventing unsanctioned use of a mobile device within a controlled environment facility, comprising:
   an application barrier stored on a memory of the mobile device, and executed by one or more processors, the application barrier configured to:
      review functions of an application stored in the memory of the mobile device;
      identify a first function of the application as belonging to a first class of functions based on the review;
      disable the first class of functions including the first function;
      identify a second function of the application belonging to a second class of functions;
      perform application modification of the second function that includes disabling non-secure functions of the second function;
      monitor usage of the second function in response to the identifying; and
      disable the second function of the application in response to the monitoring detecting prohibited activity involving the second function, the prohibited activity including attempting to modify one or more device settings of the mobile device; and
   a wireless security barrier configured to:
      detect a transmission between the mobile device and an unsanctioned wireless access point;
      block the transmission; and
      attack the unsanctioned wireless access point.

2. The system of claim 1, wherein the first class of functions include functions deemed non-useful by the controlled environment facility.

3. The system of claim 1, wherein the second class of functions include functions deemed useful by the controlled environment facility.

4. The system of claim 3, wherein the second function is a social application.

5. The system of claim 4, wherein the monitoring includes monitoring social interactions of the social application.

6. The system of claim 5, wherein the monitoring includes reviewing social interactions for illicit and/or prohibited activity.

7. The system of claim 1, wherein the application barrier is further configured to prevent installation of a new application and removal of an existing application.

8. A wireless communication device for use in a controlled environment facility, comprising:
   a transceiver configured to wireless send and receive signals with a communication server;
   a memory configured to store a plurality of applications; and
   one or more processors configured to:
      review functions of an application from among the plurality of applications stored in the memory;
      identify a first function of the application as belonging to a first class of functions based on the review;
      disable the first class of functions including the first function;
      identify a second function of the application belonging to a second class of functions;
      perform application modification of the second function that includes disabling non-secure functions of the second function;
      monitor usage of the second function in response to the identifying;
      disable the second function of the application in response to the monitoring detecting prohibited activity involving the second function, the prohibited activity including attempting to modify one or more device settings of the wireless communication device;
      transmit to an unsanctioned wireless access point; and
      receive one or more signals from a wireless security barrier preventing the transmission.

9. The wireless communication device of claim 8, wherein the first class of functions include functions deemed non-useful by the controlled environment facility.

10. The wireless communication device of claim 8, wherein the second class of functions include functions deemed useful by the controlled environment facility.

11. The wireless communication device of claim 10, wherein the second function is a social application.

12. The wireless communication device of claim 11, wherein the monitoring includes monitoring social interactions of the social application.

13. The wireless communication device of claim 12, wherein the monitoring includes reviewing social interactions for illicit and/or prohibited activity.

14. The wireless communication device of claim 13, wherein an application barrier is configured to prevent installation of a new application and removal of an existing application.

15. A method for preventing unsanctioned use of a mobile device within a controlled environment facility, comprising:
reviewing functions of an application stored in a memory of the mobile device;
identifying a first function of the application as belonging to a first class of functions based on the review;
disabling the first class of functions including the first function;
identifying a second function of the application belonging to a second class of functions;
performing application modification of the second function that includes disabling non-secure functions of the second function;
monitoring usage of the second function in response to the identifying;
disabling the second function in response to the monitoring detecting prohibited activity involving the second function, the prohibited activity including attempting to modify one or more device settings of the mobile device;
detecting a transmission between the mobile device and an unsanctioned wireless access point;
blocking the transmission; and
attacking the unsanctioned wireless access point.

16. The method of claim 15, wherein the first class of functions include functions deemed non-useful by the controlled environment facility.

17. The method of claim 15, wherein the second class of functions include functions deemed useful by the controlled environment facility.

18. The method of claim 17, wherein the second function is a social application.

19. The method of claim 18, wherein the monitoring includes monitoring social interactions of the social application.

20. The method of claim 19, wherein the monitoring includes reviewing social interactions for illicit and/or prohibited activity.

* * * * *